US011006283B2

(12) United States Patent
Sugaya

(10) Patent No.: US 11,006,283 B2
(45) Date of Patent: May 11, 2021

(54) WIRELESS COMMUNICATION CONTROL DEVICE, WIRELESS COMMUNICATION DEVICE AND WIRELESS COMMUNICATION SYSTEM

(71) Applicant: Sony Corporation, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,670

(22) PCT Filed: Jun. 22, 2017

(86) PCT No.: PCT/JP2017/022987
§ 371 (c)(1),
(2) Date: Jan. 1, 2019

(87) PCT Pub. No.: WO2018/037695
PCT Pub. Date: Mar. 1, 2018

(65) Prior Publication Data
US 2019/0230522 A1 Jul. 25, 2019

(30) Foreign Application Priority Data
Aug. 25, 2016 (JP) .............................. JP2016-164286

(51) Int. Cl.
*H04W 16/28* (2009.01)
*H04B 7/06* (2006.01)
(Continued)

(52) U.S. Cl.
CPC .......... *H04W 16/28* (2013.01); *B60W 10/184* (2013.01); *B60W 10/20* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 6,359,873 B1 * 3/2002 Kobayashi ............... H01Q 3/26
370/338
6,442,405 B1 * 8/2002 Hiramatsu ........... H04B 7/0408
455/562.1
(Continued)

FOREIGN PATENT DOCUMENTS

JP 2002-185236 A 6/2002
JP 2003-283405 A 10/2003
(Continued)

OTHER PUBLICATIONS

International Search Report dated Sep. 5, 2017 for PCT/JP2017/022987 filed on Jun. 22, 2017, 10 pages including English translation.
(Continued)

*Primary Examiner* — Brenda H Pham
(74) *Attorney, Agent, or Firm* — Xsensus, LLP

(57) ABSTRACT

A wireless communication control device, including: a detection control unit configured to give an instruction to perform radio wave detection to at least one of a plurality of wireless communication devices that perform wireless communication with directivity; and a communication control unit configured to control communication of the wireless communication device on the basis of first information specifying a direction in which a radio wave is detected by the wireless communication device. A wireless communication device, including: a detection processing unit configured to execute a radio wave detection process with directivity on the basis of an instruction to perform radio wave detection; a providing unit configured to provide first infor-
(Continued)

mation specifying a direction in which a radio wave is detected to a communication control unit; and a communication unit configured to perform wireless communication in a range of a direction related to directivity based on an external instruction.

19 Claims, 22 Drawing Sheets

(51) Int. Cl.
- H04B 7/08 (2006.01)
- B60W 10/184 (2012.01)
- B60W 10/20 (2006.01)
- H04W 72/04 (2009.01)

(52) U.S. Cl.
CPC ......... *H04B 7/0602* (2013.01); *H04B 7/0617* (2013.01); *H04B 7/0695* (2013.01); *H04B 7/0802* (2013.01); *H04W 72/0473* (2013.01)

(58) Field of Classification Search
CPC ..... H04W 84/18; H04W 74/08; H04W 36/30; H04W 36/24; H04W 16/28; H04W 72/0473; H04B 1/50; H04B 1/56; H04B 7/0602; H04B 7/0802; H04B 7/0617; H04B 7/0695
USPC ...................... 370/310.2, 328, 338, 334, 332
See application file for complete search history.

(56) References Cited

U.S. PATENT DOCUMENTS

| 7,596,388 B2 | 9/2009 | Willins et al. | |
| 7,974,600 B2* | 7/2011 | Kanada | H04W 76/50 455/404.1 |
| 2003/0129978 A1* | 7/2003 | Akiyama | H04L 12/5692 455/426.1 |
| 2004/0171407 A1 | 9/2004 | Ninomiya | |
| 2007/0224942 A1* | 9/2007 | Kuramoto | H01Q 1/2216 455/67.11 |
| 2011/0065391 A1* | 3/2011 | Shiotsuki | H04B 7/0615 455/63.4 |
| 2013/0189929 A1* | 7/2013 | Takahashi | H01Q 3/24 455/67.7 |

FOREIGN PATENT DOCUMENTS

| JP | 2005-268924 A | 9/2005 |
| JP | 2010-093564 A | 4/2010 |
| JP | 2014-090271 A | 5/2014 |

OTHER PUBLICATIONS

Extended European Search Report dated Jun. 26, 2019, issued in corresponding European Application No. 17843183.9, 13 pages.

Takai et al., Directional Virtual Carrier Sensing for Directional Antennas in Mobile Ad Hock Networks, pp. 183-193, XP-001171558, UCLA Computer Science Department and Scalable Network Technologies, Los Angeles, CA.

Capone et al., Power-Controlled Directional Medium Access Control for Wireless Mesh Networks, pp. 34-46, Wireless Syst./Network Architect, 2005 LNCS 3883.

* cited by examiner

FIG. 14 S408,S409

WIRELESS COMMUNICATION CONTROL DEVICE, WIRELESS COMMUNICATION DEVICE AND WIRELESS COMMUNICATION SYSTEM

CROSS-REFERENCE TO RELATED APPLICATIONS

This application is a National Stage Application based on PCT/JP2017/022987, filed on 22 Jun. 2017, and claims priority to Japanese Patent Application No. 2016-164286, filed on 25 Aug. 2016, the entire contents of which being incorporated herein by reference.

TECHNICAL FIELD

The present disclosure relates to a wireless communication control device, a wireless communication device, and a wireless communication system.

BACKGROUND ART

In recent years, wireless local area networks (LANs) represented by Institute of Electrical and Electronics Engineers (IEEE) 802.11 have been spreading widely. Further, wireless LAN compatible products (hereinafter also referred to as wireless communication devices) have been increasing as well. On the other hand, wireless communication resources available for communication are limited. In this regard, extending available wireless communication resources has been considered. For example, extending a frequency band used for communication has been considered.

Here, as a frequency of a radio wave is higher, the directivity of the radio wave is higher. Specifically as the frequency of the radio wave is higher, straightness of the radio wave is higher. As a result, radio waves are propagated only in a specific direction, and on a radio wave reception side, a radio wave is received only in the specific direction. Therefore, in order to detect a radio wave on the radio wave receiver side, it is necessary to scan transmission paths in all directions, to detect a direction in which the radio wave arrives in advance, or to fix a transmission path.

As a technique for scanning transmission paths in all directions, there is a technique of scanning transmission paths in all directions by physically moving no antenna having directivity. For example, each transmission path in each direction is scanned by causing the antenna to rotate physically. Accordingly, it is possible to detect a radio wave coming in a specific direction.

Further, as a technique for detecting a direction in which a radio wave comes in advance, there is a training procedure in beam forming. For example, in an IEEE 802.11ad standard, a training signal is exchanged between wireless communication devices for each sector before communication is started, and a reception result of the training signal is fed back. Further, a beam direction, that is, a transmission direction of a radio wave, is decided on the basis of the feedback. Accordingly, it is possible to detect a radio wave coming in a specific direction without scanning the transmission paths in all directions one by one.

Further, as an example of the technology for fixing the transmission path, there is a technique disclosed in Patent Literature 1. In the technique disclosed in Patent Literature 1, antennas 1 and 2 are installed in a vehicle, a communication range of the antenna 1 is fixed to a front direction of the vehicle, and a communication range of the antenna 2 is fixed to a rear direction of the vehicle. Accordingly, it is possible to detect a radio wave coming in a specific direction without scanning the transmission path and without executing the training procedure.

CITATION LIST

Patent Literature

Patent Literature 1: JP 2010-093564A

DISCLOSURE OF INVENTION

Technical Problem

However, with the technique of the related art represented by the above-mentioned technique, it is difficult to achieve both suppression of overhead in communication and efficient use of wireless communication resources. For example, in a case in which the transmission paths in all directions are scanned, it takes time until the transmission paths in all directions are scanned. Further, a time lag may occur in scanning between the transmission paths in the respective directions, and reception may fail. Further, in a case in which the training procedure in beam forming is performed, it takes time to exchange the training signal and give feedback. Further, in a case in which a communication direction is fixed in accordance with an 0antenna as in the technique disclosed in Patent Literature 1, since communication is performed in a fixed direction irrespective of a position of a communication counterpart, wireless communication resources are likely to be wasted.

In this regard, the present disclosure proposes a mechanism capable of achieving both suppression of overhead in communication and efficient use of wireless communication resources.

Solution to Problem

According to the present disclosure, there is provided a wireless communication control device, including: a detection control unit configured to give an instruction to perform radio wave detection to at least one of a plurality of wireless communication devices that perform wireless communication with directivity; and a communication control unit configured to control communication of the wireless communication device on the basis of first information specifying a direction in which a radio wave is detected by the wireless communication device.

According to the present disclosure, there is provided a wireless communication device, including: a detection processing unit configured to execute a radio wave detection process with directivity on the basis of an instruction to perform radio wave detection: a providing unit configured to provide first information specifying a direction in which a radio wave is detected to a communication control unit; and a communication unit configured to perform wireless communication in a range of a direction related to directivity on the basis of an instruction from the communication control unit.

In addition, according to the present disclosure, there is provided a wireless communication system, including: a detection control unit configured to give an instruction to perform radio wave detection to at least one of a plurality of communication units that perform wireless communication with directivity; a detection processing unit configured to execute a radio wave detection process in a range of a direction related to directivity on the basis of the instruction to perform the radio wave detection; a providing unit configured to provide first information specifying a direction in which a radio wave is detected to a communication control unit; the communication control unit configured to control communication of a communication unit on the basis of first information specifying a direction in which the radio wave is detected by the communication unit; and the communication unit configured to perform wireless communication with directivity on the basis of an instruction from the communication control unit.

Advantageous Effects of Invention

As described above, according to the present disclosure, a mechanism capable of achieving both suppression of overhead in communication and efficient use of wireless communication resources is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
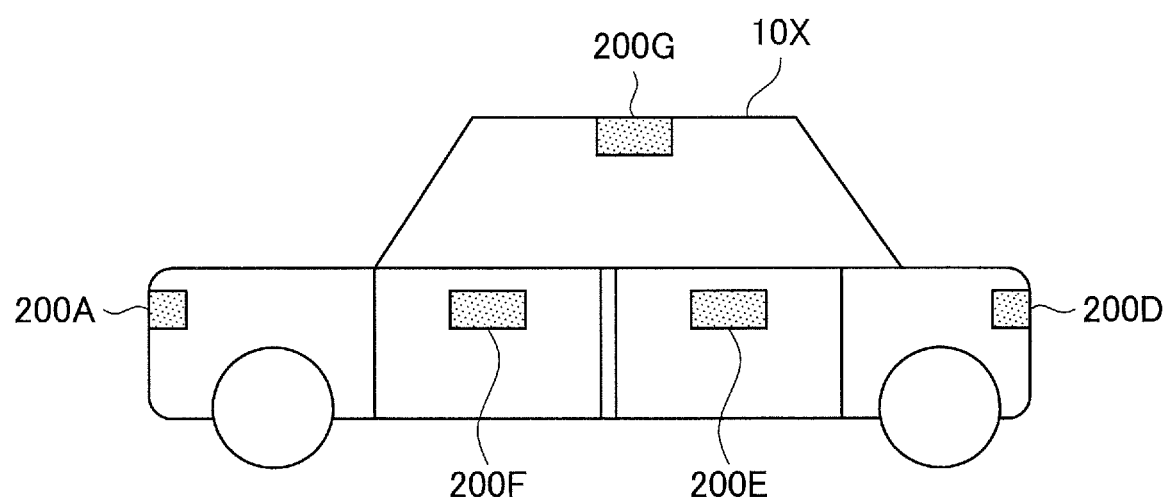
FIG. 1 is a diagram for describing an example of a physical configuration of a wireless communication system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function is distinguished as necessary like a wireless communication device 200A and a wireless communication device 200B. However, in a case where it is unnecessary to distinguish elements having substantially the same function, only the same reference numeral is added. For example, in a case where it is unnecessary to particularly distinguish a wireless communication device 200A and a wireless communication device 200B, they are simply referred to as a "wireless communication device 200."

Further, the description will proceed in the following order.
1. Introduction
2. System and device according to one embodiment of the present disclosure
2.1. Configuration
2.2. Functions
2.3. Flow of process
2.4. Application example
2.5. Conclusion of one embodiment of the present disclosure
2.6. Modified examples
3. Application example
4. Conclusion

1. INTRODUCTION

First, technology related to a wireless communication system according to one embodiment of the present disclosure will be described. As this technology, there is beam forming technology. Specifically, a mechanism for communicating signals using beam forming technology is specified in the IEEE 802.11ad standard.

In this standard, a sector level sweep process and a beam refinement process are executed before communication is started, so that a direction of a transmission path used for communication (hereinafter also referred to as a communication direction) is decided. For example, a first communication station (initiator) performs a transmission sector sweep (Initiator Sector Sweep (ISS)), and then a second communication station (a responder) performs a transmission sector sweep (Responder Sector Sweep (RSS)). Thereafter, a notification of sector sweep feedback is given from the first communication station, and a sector sweep acknowledgment (ACK) is transmitted from the second communication station. After the sector level sweep process is executed as described above, the beam refinement process is executed. For example, beam refinement protocol (BRP)-RX and BRP-TX are exchanged between the first communication station and the second communication station. Further, feedback for the exchange of these signals is performed, and a beam direction is decided on the basis of the feedback.

As described above, according to the related art, sectors used in communication, that is, beam directions, are shared in advance between the wireless communication devices, and thus communication using the beam forming technology can be performed without fixing the beam direction. Therefore, it is possible to increase certainty of communication, and it is possible to suppress wireless communication resources from being wasted. On the other hand, since the process for deciding the beam direction is executed before the communication is started, the overhead in communication increases. In other words, it is difficult to suppress the latency until communication is started.

In this regard, the present disclosure proposes a wireless communication system capable of achieving both suppression of the overhead in communication and efficient use of wireless communication resources.

2. SYSTEM AND DEVICE ACCORDING TO ONE EMBODIMENT OF THE PRESENT DISCLOSURE

Next, a wireless communication system and a wireless communication control device for realizing the wireless communication system according to one embodiment of the present disclosure will be described.

2.1. Configuration

[Configuration of System]

First, a configuration of a wireless communication system (hereinafter also simply referred to as a wireless communication system) according to one embodiment of the present disclosure will be described. An example of a physical configuration of the wireless communication system will be described with reference to FIG. 1. FIG. 1 is a diagram for describing a physical configuration example of a wireless communication system according to one embodiment of the present disclosure.

The wireless communication system includes an integrated control device 100 serving as a wireless communication control device and wireless communication devices 200. For example, the integrated control device 100 and the wireless communication devices 200 are installed in a vehicle 10X illustrated in FIG. 1 which is a mobile body and the wireless communication devices 200 are arranged in different places in the vehicle 10X. In the example of FIG. 1, the wireless communication devices 200A to 200G are arranged on a front surface, a right front side, a right rear side, a rear surface, a left rear side, a left front side, and a top surface of the vehicle 10X. Further, in FIG. 1, the wireless communication devices 200B and 200C positioned on the back side are not illustrated.

Figure 2:
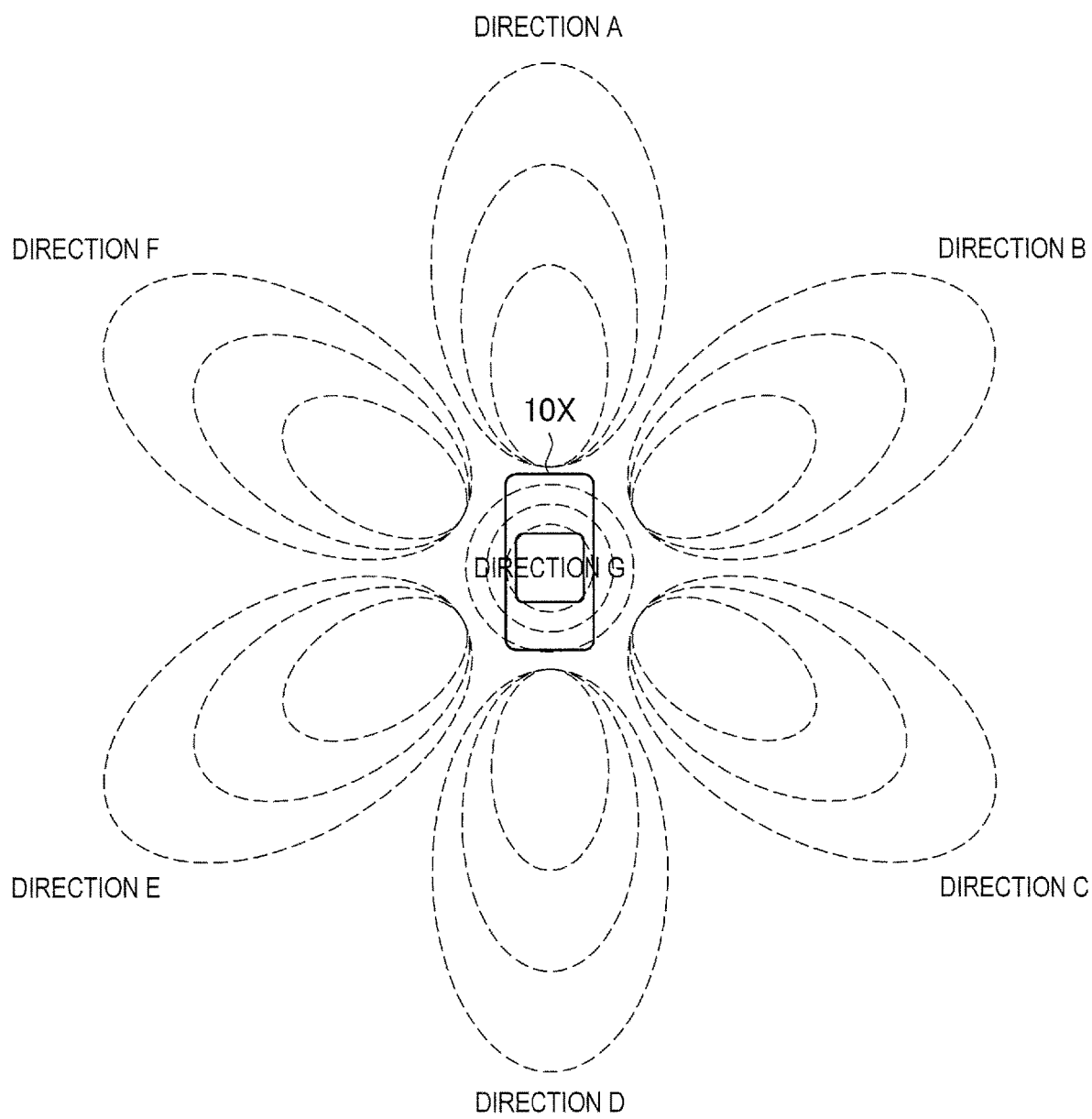
FIG. 2 is a diagram illustrating an example of a communication direction of a wireless communication system according to the embodiment.
Figure 3:
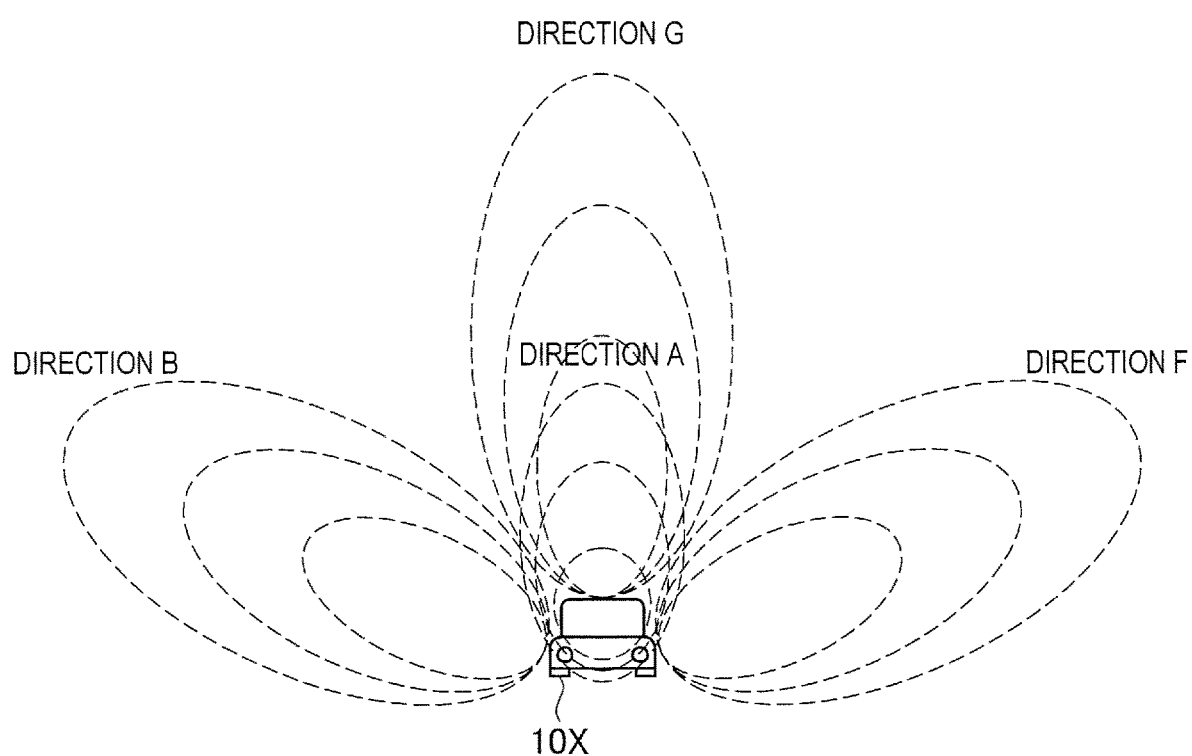
FIG. 3 is a diagram illustrating an example of a communication direction of a wireless communication system according to the embodiment.

The wireless communication system performs wireless communication having directivity. Specifically, the wireless communication device 200 has a wireless communication function having directivity and is arranged at a position corresponding to a direction related to directivity. Wireless communication having directivity in the wireless communication system will be described with reference to FIGS. 2 and 3. FIGS. 2 and 3 are diagrams illustrating an example of a communication direction of the wireless communication system according to one embodiment of the present disclosure.

Each of the wireless communication devices 200 installed in the wireless communication system performs wireless communication having directivity in a fixed direction. For example, the wireless communication device 200A arranged on the front surface of the vehicle receives a signal coming in a direction A illustrated in FIG. 2 and transmits a signal in the direction A. Similarly, the wireless communication devices 200B to 200G transmit and receive signals in directions B to G. Further, the direction related to the directivity may be inclined to the ground instead of being parallel to the ground. For example, as illustrated in FIG. 3, the directions A to F may be directions inclined upward with respect to the ground.

Figure 4:
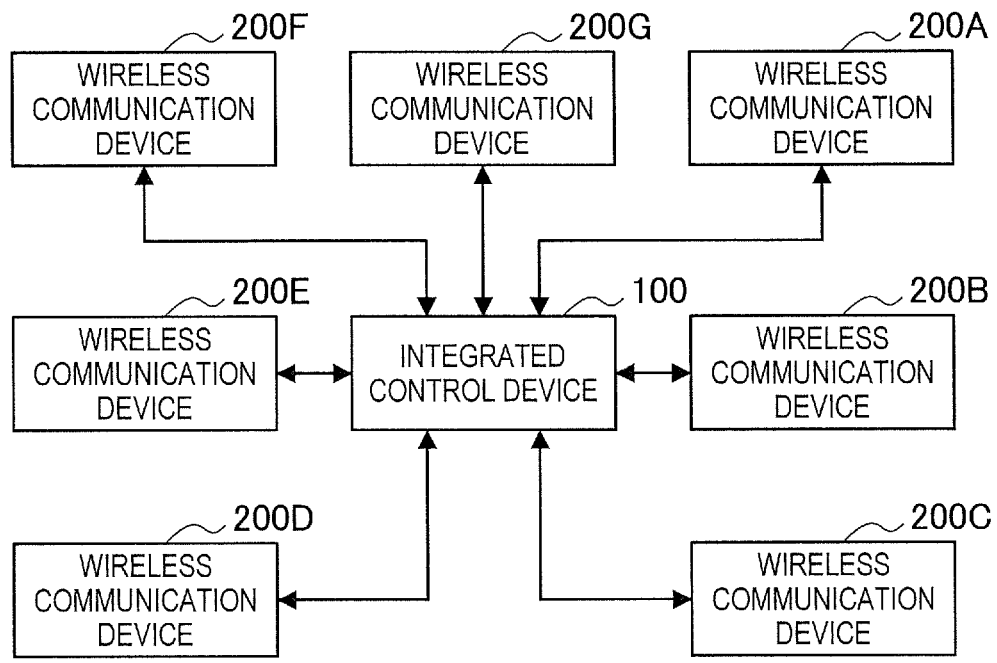
FIG. 4 is a block diagram schematically illustrating an arrangement example of devices in a wireless communication system according to the embodiment.

The integrated control device 100 and the wireless communication devices 200 included in the wireless communication system are connected via communication. An example of an arrangement of devices in the wireless communication system will be described with reference to FIG. 4. FIG. 4 is a block diagram schematically illustrating an arrangement example of devices in the wireless communication system according to one embodiment of the present disclosure.

As illustrated in FIG. 4, the integrated control device 100 is connected with the wireless communication devices 200A to 200G via communication. The integrated control device 100 and the wireless communication device 200 may be connected via wired communication or may be connected via wireless communication of a scheme different from a wireless communication scheme with the directivity of the wireless communication device 200.

Figure 5:
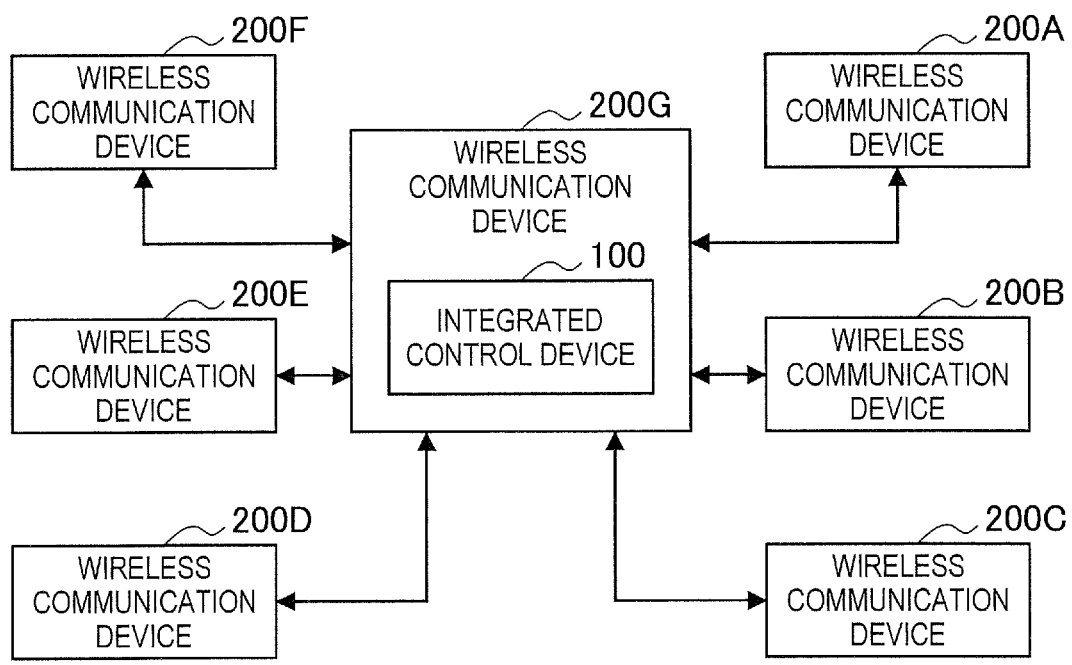
FIG. 5 is a block diagram schematically illustrating another example of an arrangement of devices in a wireless communication system according to the embodiment.

Further, in the example of FIG. 4, the integrated control device 100 is installed independently of the wireless communication device 200, but the integrated control device 100 and the wireless communication device 200 may be realized by a single device. An example in which the integrated control device 100 and the wireless communication device 200 are realized in a single device will be described with reference to FIG. 5. FIG. 5 is a block diagram schematically illustrating another example of an arrangement of devices in the wireless communication system according to one embodiment of the present disclosure.

The integrated control device 100 may be incorporated into the wireless communication device 200. For example, as illustrated in FIG. 5, the integrated control device 100 is installed in the wireless communication device 200G and communicates with the other wireless communication devices 200A to 200F via the wireless communication device 200G. Further, the integrated control device 100 does not communicate with the wireless communication device 200G but performs transfer and exchange of information via a storage unit installed in the wireless communication device 200G. Further, in the example of FIG. 5, the integrated control device 100 is installed in the wireless communication device 200G, but at least one of the wireless communication devices 200A to 200G may be installed in the integrated control device 100, or the integrated control device 100 and the wireless communication device 200 may be installed in another device.

[Configuration of Integrated Control Device]

Figure 6:
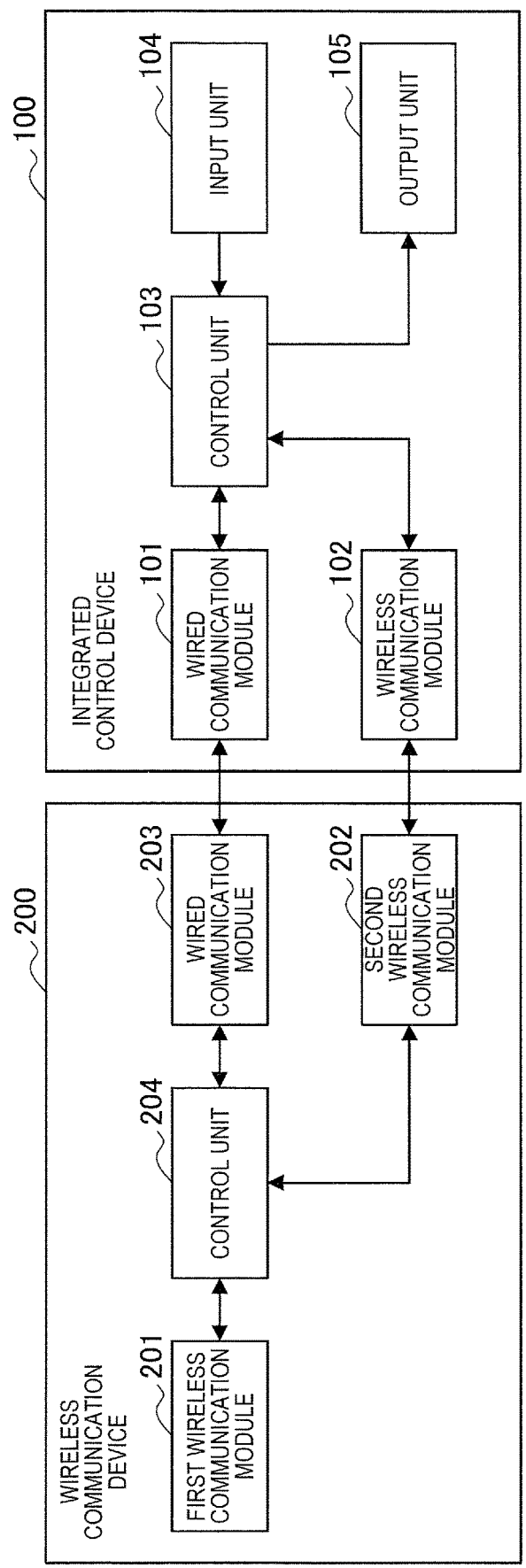
FIG. 6 is a block diagram schematically illustrating an example of a functional configuration of an integrated control device and a wireless communication device according to the embodiment.

Next, a functional configuration of the integrated control device 100 will be described with reference to FIG. 6. FIG. 6 is a block diagram schematically illustrating an example of a functional configuration of integrated control device 100 and the wireless communication device 200 according to one embodiment of the present disclosure.

As illustrated in FIG. 6, the integrated control device 100 includes a wired communication module 101, a wireless communication module 102, and a control unit 103.

The wired communication module 101 communicates with a device in the wireless communication system in a wired manner. Specifically, the wired communication module 101 performs wired communication with the wireless communication device 200. For example, the wired communication module 101 establishes a connection with each of the wireless communication devices 200 via a local network such as an in-vehicle network, and receives data from each of the wireless communication devices 200 and transmits data to each of the wireless communication devices 200. Further, the wired communication module 101 may communicate with an external device via the Internet. For example, the wired communication module 101 transmits data acquired by communication with the wireless communication device 200 to an external device via the Internet.

The wireless communication module 102 performs wireless communication with the device in the wireless communication system. Specifically, the wireless communication module 102 performs wireless communication with the wireless communication device 200. For example, the wireless communication module 102 establishes a connection with each of the wireless communication devices 200 using wireless LAN communication, and receives data from each of the wireless communication devices 200 and transmits data to each of the wireless communication devices 200.

The control unit 103 controls overall operation of the integrated control device 100. Specifically, the control unit 103 causes the wired communication module 101 and the wireless communication module 102 to perform communication. For example, the control unit 103 causes the wired communication module 101 or the wireless communication module 102 to transmit data obtained from an input unit 104. Further, the control unit 103 causes an output unit 105 to output data obtained by communication of the wired communication module 101 or the wireless communication module 102 or causes the output unit 105 to operate on the basis of the data.

Further, the control unit 103 controls communication of the wireless communication device 200. Specifically, the control unit 103 gives an obstruction for communication with the wireless communication device 200 via the wired communication module 101 or the wireless communication module 102. These functions will be described later in detail.

The input unit 104 receives an input from the outside of the integrated control device 100. Specifically, the input unit 104 receives a user input or information obtained from a sensor. For example, the input unit 104 is realized by an input device such as a keyboard or a touch panel or a detection device such as an imaging sensor or an acceleration sensor.

The output unit 105 performs an output based on data. Specifically, the output unit 105 outputs data instructed from the control unit 103 or operates on the basis of an instruction from the control unit 103. For example, the output unit 105 is realized by a display that outputs an image on the basis of image information or an output device such as a speaker that outputs a sound or music on the basis of sound information. Further, the output unit 105 causes a manipulator to operate on the basis of an instruction from the control unit 103.

Further, one of the wired communication module 101 and the wireless communication module 102, the input unit 104, and the output unit 105 among the above-mentioned components may not be installed in the integrated control device 100.

[Configuration of Wireless Communication Device]

Next, the functional configuration of the wireless communication device 200 will be described with reference to FIG. 6. As illustrated in FIG. 6, the wireless communication device 200 includes a first wireless communication module 201, a second wireless communication module 202, a wired communication module 203, and a control unit 204.

The first wireless communication module 201 performs wireless communication with a device outside the wireless communication system. Specifically, the first wireless communication module 201 performs wireless communication on the basis of an instruction from the integrated control device 100. For example, the first wireless communication module 201 performs transmission and reception of signals with a device outside the wireless communication system using communication having a different scheme from the communication of the second wireless communication module 202. The configuration will be described later in detail.

The second wireless communication module 202 performs wireless communication with a device in the wireless communication system. Specifically, the second wireless communication module 202 performs wireless communication with the integrated control device 100. Further, since the second wireless communication module 202 has substantially the same configuration as the wireless communication module 102 described above, detailed description thereof will be omitted.

The wired communication module 203 performs communication with a device in the wireless communication system in a wired manner. Specifically, the wired communication module 203 performs wired communication with the integrated control device 100. Further, since the wired communication module 203 has substantially the same configuration as the wired communication module 101 described above, detailed description thereof will be omitted.

The control unit 204 controls the operation of the wireless communication device 200 in general. Specifically, the control unit 204 causes the first wireless communication module 201, the second wireless communication module 202, and the wired communication module 203 to perform communication. For example, the control unit 204 causes the first wireless communication module 201 to transmit data obtained by the communication of the second wireless communication module 202 or the wired communication module 203. Further, the control unit 204 provides data obtained by the communication of the first wireless communication module 201 to the integrated control device 100 via the second wireless communication module 202 or the wired communication module 203. These functions will be described later in detail.

[Configuration of First Wireless Communication Module]

Figure 7:
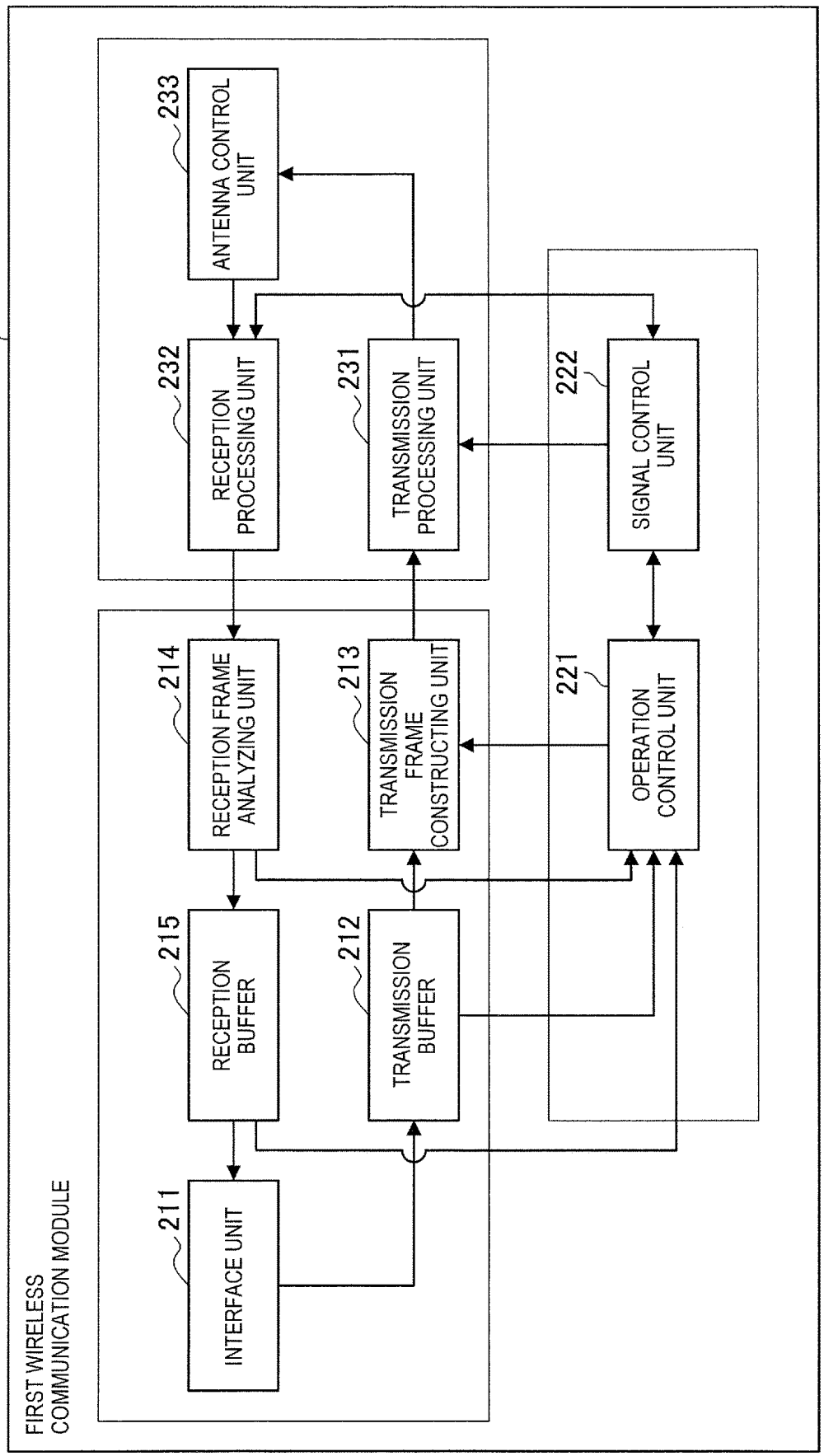
FIG. 7 is a block diagram illustrating an example of a schematic functional configuration of a first wireless communication module according to the embodiment.

Next, a functional configuration of the first wireless communication module 201 will be described with reference to FIG. 7. FIG. 7 is a block diagram illustrating an example of a schematic functional configuration of the first wireless communication module 201 according to one embodiment of the present disclosure.

As illustrated in FIG. 7, the first wireless communication module 201 includes an interface unit 211, a transmission buffer 212, a transmission frame constructing unit 213, a reception frame analyzing unit 214, a reception buffer 215, an operation control unit 221, a signal control unit 222, a transmission processing unit 231, a reception processing unit 232, and an antenna control unit 233.

The interface unit 211 is an interface connected to another functional configuration provided in the wireless communication device 200. Specifically, the interface unit 211 performs reception of data desired to be transmitted from another functional configuration, for example, the control unit 204, provision of reception data to the control unit 204, or the like.

The transmission buffer 212 stores data to be transmitted. Specifically, the transmission buffer 212 stores data obtained by the interface unit 211.

The transmission frame constructing unit 213 generates a frame to be transmitted. Specifically, the transmission frame constructing unit 213 generates a frame on the basis of data stored in the transmission buffer 212 or control information set by the operation control unit 221.

The reception frame analyzing unit 214 analyzes a received frame. Specifically, the reception frame analyzing unit 214 performs determination of a destination of a frame restored by the reception processing unit 232 and acquisition of data or control information included in the frame.

The reception buffer 215 stores received data. Specifically, the reception buffer 215 stores data acquired by the reception frame analyzing unit 214.

The operation control unit 221 controls the occurrence of communication. Specifically, if a communication connection request occurs, the operation control unit 221 causes the transmission frame constructing unit 213 to generate a frame related to a connection process or an authentication process such as an association process or an authentication process. Further, the operation control unit 221 controls the frame generation on the basis of a storage state of data in the transmission buffer 212, an analysis result for a received frame, or the like. Further, in a case in which reception of the frame is confirmed by the reception frame analyzing unit 214, the operation control unit 221 instructs the transmission frame constructing unit 213 to generate an acknowledgement frame serving as a response to the received frame.

The signal control unit 222 controls transmission and reception processes of the transmission processing unit 231 and the reception processing unit 232. Specifically, the signal control unit 222 decides parameters for transmission and reception on the basis of an instruction of the operation control unit 221.

The transmission processing unit 231 performs a frame transmission process. Specifically, the transmission processing unit 231 generates a signal to be transmitted on the basis of the frame provided from the transmission frame constructing unit 213. The generated signal is provided to the antenna control unit 233.

The reception processing unit 232 performs a frame reception process. Specifically, the reception processing unit 232 restores the frame on the basis of the signal provided from the antenna control unit 233. The restored frame is provided to the reception frame analyzing unit 214.

The antenna control unit 233 controls transmission and reception of signals via at least one antenna. Specifically, the antenna control unit 233 transmits a signal generated by the transmission processing unit 231 via an antenna, and provides a signal received via the antenna to the reception processing unit 232.

2.2. Functions

Next, functions of the wireless communication system according to one embodiment of the present disclosure will be described.

(Radio Wave Detection Function)

The integrated control device 100 gives an instruction to perform radio wave detection to at least one of a plurality of wireless communication devices 200. Specifically, the control unit 103 instructs the wireless communication device 200 to perform radio wave detection over a predetermined period via communication as a detection control unit. For example, the control unit 103 causes the wired communication module 101 or the wireless communication module 102 to transmit a radio wave detection request to all the wireless communication devices 200 which are connected via communication. Further, information of a parameter related to the radio wave detection (for example, a detection frequency, a detection period, or the like) and information of a transmission parameter used in transmission of a detection result (for example, a transmission frequency, a transmission period, or the like) may be stored in the radio wave detection request. Further, the transmission parameter may be a parameter for multiple access communication. The multiple access may be frequency division multiple access, orthogonal frequency division multiple access, space division multiple access, time division multiple access, or code division multiple access.

The wireless communication device 200 performs the radio wave detection on the basis of the radio wave detection instruction. Specifically, on the basis of the radio wave detection request notified from the integrated control device 100, the control unit 204 causes the first wireless communication module 201 operating as a detection processing unit to execute a radio wave detection process in a range of a direction related to directivity. For example, in response to reception of the radio wave detection request, the control unit 204 causes the first wireless communication module 201 to start the radio wave detection process, and the first wireless communication module 201 performs the radio wave detection process in a transmission path in a direction related to directivity of the first wireless communication module 201 itself. Here, the radio wave detection process may be a radio wave detection process, a process of detecting a signal propagated via a radio wave (detection of a preamble, detection of a signal whose received electric field strength is a threshold value or more, or the like), a carrier sense process such as a carrier sense multiple access (CSMA), a process of virtually detecting a signal such as a virtual carrier sense process using RTS/CTS or the like, or a combination thereof. Further, the radio wave detection process may end on the basis of a radio wave detection end time designated from the integrated control device 100. For example, the radio wave detection process may end on the basis of arrival of the radio wave detection end time designated from the integrated control device 100, or the radio wave detection process may end on the basis of reception of a radio wave detection end request from the integrated control device 100. Further, the radio wave detection process may end when a predetermined time elapses after the radio wave detection process is started.

Then, if the radio wave is detected, the wireless communication device 200 notifies the integrated control device 100 of a detection result. Specifically, if a radio wave or signal is detected by the first wireless communication module 201, the control unit 204 causes the second wireless communication module 202 or the wired communication module 203 to transmit a detection result indicating that the radio wave is detected to the integrated control device 100. For example, the control unit 204 causes the second wireless communication module 202 or the wired communication module 203 to transmit the detection result using the transmission parameter notified from the integrated control device 100. Further, in a case in which the transmission parameter to be used is a parameter for multiple access communication, the detection result is multiplexed. Similarly, a reception result to be described later may be transmitted using multiple access communication. Further, in the detection result, information indicating a power level of a detected radio wave or signal (hereinafter also referred to as a detection level) may be stored, or information indicating a state of the transmission path (for example, an idle state or a busy state) may be stored.

The integrated control device 100 stores the detection result. Specifically, if the detection result is notified, the control unit 103 causes a storage unit (not illustrated) to store information serving as first information specifying a direction in which the radio wave is detected (hereinafter also referred to as detection direction information). For example, the control unit 103 causes the storage unit to store information indicating a direction corresponding to the wireless communication device 200 which is a notification source of the detection result or identification information of the wireless communication device 200. Further, the state of the transmission path in the direction in which the radio wave is detected may be stored together with the detection direction information.

(Reception Function)

The integrated control device 100 controls reception of the wireless communication device 200. Specifically, the control unit 103 controls a reception mode of the wireless communication device 200 on the basis of the detection direction information as a communication control unit. More specifically, the control unit 103 gives an instruction to receive a signal to the wireless communication device 200 which is specified from the detection direction information and has detected the radio wave. For example, the control unit 103 causes the wired communication module 101 or the wireless communication module 102 to transmit a reception request to each of the wireless communication devices 200 specified from the detection direction information. Further, the reception request may store information of a parameter used in a reception process (for example, a reception frequency, a reception period, or the like).

The wireless communication device 200 performs the reception process on the basis of an instruction from the integrated control device 100. Specifically, the control unit 204 causes the first wireless communication module 201 to receive a signal on the basis of an instruction from the integrated control device 100, and provides a signal reception result to the integrated control device 100 through the second wireless communication module 202 or the wired communication module 203. For example, if the reception request is received from the integrated control device 100, the control unit 204 activates a reception function of the first wireless communication module 201. Then, the first wireless communication module 201 is on standby for reception of the signal. If the signal is received, the first wireless communication module 201 provides data (reception data) stored in the signal as a reception result to the control unit 204 and stops the reception function. The control unit 204 provides the provided reception data to the integrated control device 100 through the second wireless communication module 202 or the wired communication module 203. The reception data includes information, indicating a transmission source of communication upper layer data, communication control data, or the reception data, information indicating a power level of the received signal (hereinafter also referred to as a reception level), or the like. Further, in a case in which the signal is not received, the reception process may end on the basis of a reception end request transmitted from the integrated control device 100 or may end when a predetermined time elapses after the reception process is started.

The integrated control device 100 registers a communication counterpart on the basis of the reception result provided from the wireless communication device 200. Specifically, the control unit 103 associates the wireless communication device 200 which has received a received signal with a transmission source of the received signal based on the power level of the received signal using the provided reception result. For example, the control unit 103 causes the storage unit to store the association between the identification information of the wireless communication device 200 in which the reception level included in the reception data is higher than any other wireless communication device 200 and the transmission source information included in the reception data.

(Transmission Functions)

The integrated control device 100 controls transmission of the wireless communication device 200. Specifically, the control unit 103 controls a transmission mode of the wireless communication device 200 on the basis of the detection direction information. More specifically, the control of the transmission mode is control of whether or not transmission is performed, and the control unit 103 gives an instruction to transmit a signal to the wireless communication device 200 other than the wireless communication device 200 which is specified from the detection direction information and has detected the radio wave. The wireless communication device 200 other than the wireless communication device 200 specified from the detection direction information includes the wireless communication device 200 which is not adjacent to the wireless communication device 200 which has detected the radio wave in terms of the direction related to directivity. For example, a case in which the radio wave is detected in the wireless communication device 200 in which the direction related to the directivity is the direction A illustrated in FIG. 2. In this case, the control unit 103 causes the wired communication module 101 or the wireless communication module 102 to transmit a signal transmission request to the wireless communication devices 200C to 200E and 200G other than the wireless communication devices 200B and 200F corresponding to the directions B and F adjacent to the direction A. Further, information of the transmission parameter used in the transmission process (for example, a transmission frequency, a transmission period, or the like) may be stored in the transmission request.

The wireless communication device 200 performs the transmission process on the basis of a transmission instruction from the integrated control device 100. Specifically, the control unit 204 causes the first wireless communication module 201 to transmit a signal on the basis of an instruction from the integrated control device 100 and data to be provided. For example, if the transmission request is received, the control unit 204 causes the first wireless communication module 201 to set the transmission parameter to be notified using the transmission request and causes the first wireless communication module 201 to transmit data to be provided.

The integrated control device 100 gives an instruction to perform a reception process for a response signal to the transmission signal. Specifically, after the notification of the transmission request is given, the control unit 103 gives a notification indicating a reception request for an acknowledgement signal transmitted in response to a transmission signal transmitted to the wireless communication device 200 to the wireless communication device 200. For example, the control unit 103 causes the wired communication module 101 or the wireless communication module 102 to transmit the reception request for the acknowledgement signal to a transmission destination of the transmission request and the wireless communication device 200 adjacent to the transmission destination in terms of the direction related to the directivity. Further, the acknowledgement signal may be transmitted to all the wireless communication devices 200.

The wireless communication device 200 performs the reception process for the response signal to the transmission signal. Specifically, if the reception request for the acknowledgement signal to the transmission signal is received, the control unit 204 causes the first wireless communication module 201 to perform the reception process for the acknowledgement signal. Then, the control unit 204 provides the reception result for the acknowledgement signal to the integrated control device 100 through the wired communication module 101 or the wireless communication module 102. For example, if the reception request for the acknowledgement signal is received from the integrated control device 100, the control unit 204 causes the first wireless communication module 201 to execute the reception process described above. If the acknowledgement signal is received, the control unit 204 causes the second wireless communication module 202 or the wired communication module 203 to transmit an acknowledgement reception result indicating that the acknowledgement signal has been received to the integrated control device 100. Further, the reception result may include information indicating the transmission source of the acknowledgement signal information indicating the reception level of the acknowledgement signal or the like.

The integrated control device 100 stops the transmission instruction of the wireless communication device 200 on the basis of the reception result for the response signal. Specifically, the control unit 103 continues the transmission instruction until the reception result for the response signal is notified of, and stops the transmission instruction if the reception result for the response signal is notified of. For example, if the reception result for the response signal is received, the control unit 103 causes the transmission of the transmission request by the wired communication module 101 or the wireless communication module 102 to be stopped.

If the reception result for the response signal is notified of, the integrated control device 100 gives an instruction to release a transmission buffer of the wireless communication device 200. For example, if the reception result for the response signal is received, the control unit 103 causes the wired communication module 101 or the wireless communication module 102 to transmit a buffer release request for causing data provided to the wireless communication device 200 to be released from the transmission buffer.

The wireless communication device 200 releases the transmission buffer on the basis of the instruction of the integrated control device 100. For example, if the buffer release request is received from the integrated control device 100, the control unit 204 causes the first wireless communication module 201 to release the data provided from the integrated control device 100 from the transmission buffer.
(Learning Function)

The integrated control device 100 controls a process related to the communication of the wireless communication device 200 on the basis of the reception result. Specifically, the control unit 103 gives an instruction to perform a process related to communication to the wireless communication device 200 specified on the basis of an association with a communication counterpart. For example, in a case in which the wireless communication device 200 is caused to receive a signal, when the transmission source of the signal is detected, the control unit 103 specifies the wireless communication device 200 associated with the transmission source on the basis of the association stored in the storage unit. Then, the control unit 103 notifies the specified wireless communication device 200 of the reception request. Further, in a case in which the wireless communication device 200 is caused to transmit a signal, the control unit 103 specifies the wireless communication device 200 associated with the transmission destination of the signal on the basis of the association stored in the storage unit. Then, the control unit 103 gives a notification of a CSMA request serving as a radio wave detection result to the specified wireless communication device 200, and gives a notification of the transmission request to the wireless communication device 200 which has not transmitted a CSMA result.

Further, the association may be updated under a predetermined condition. For example, the predetermined condition may be a reception failure, a transmission failure (that is, a response signal reception failure), the passage of predetermined time after an association is registered, or the like. Further, the association may be a one-to-one correspondence between the transmission source of the received signal and the wireless communication device 200 or a one-to-many or many-to-many correspondence.

2.3. Flow of Process

Next, a flow of a process of the wireless communication system according to one embodiment of the present disclosure will be described.
(Radio Wave Detection Process and Reception Process)

Figure 8:
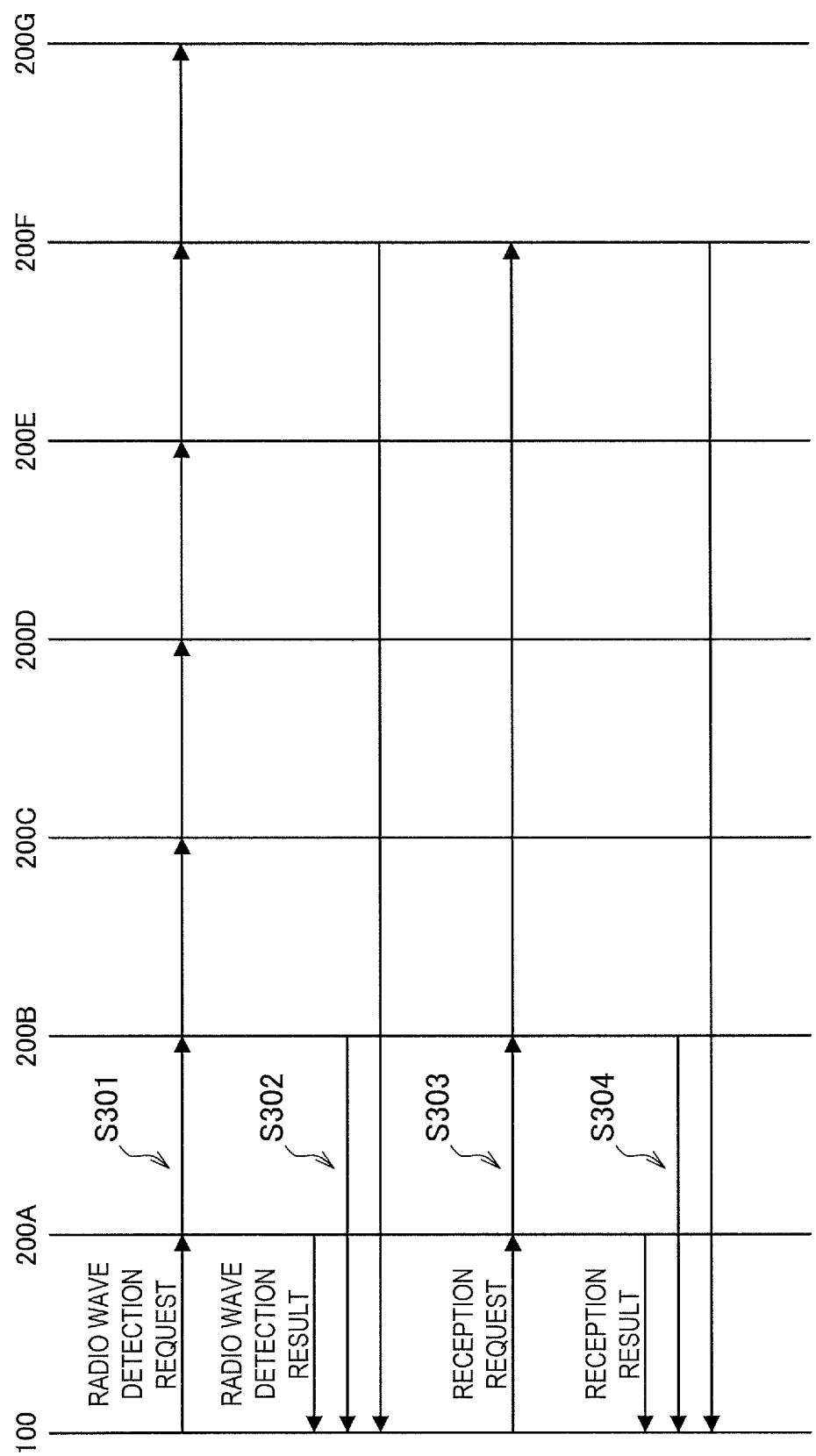
FIG. 8 is a sequence diagram conceptually illustrating an example of a radio wave detection process and a reception process of a wireless communication system according to the embodiment.

First, the radio wave detection process and the reception process of the wireless communication system will be described with reference to FIG. 8. FIG. 8 is a sequence diagram conceptually illustrating an example of the radio wave detection process and the reception process of the wireless communication system according to one embodiment of the present disclosure.

The integrated control device 100 transmits the radio wave detection request to the wireless communication devices 200A to 200G (step S301). As described above, signal detection omission is prevented by causing all the arranged wireless communication devices 200 to perform the radio wave detection. The wireless communication devices 200A to 200G which have received the radio wave detection request execute the radio wave detection process, and the wireless communication devices 200A, 200B, and 200F which have detected the radio wave transmit the radio wave detection result to the integrated control device 100 (step S302). Further, the radio wave detection result may be simultaneously communicated using a multiple access scheme such as orthogonal frequency division multiple access (OFDMA) or space division multiple access (SDMA).

The integrated control device 100 which has received the radio wave detection result transmits the reception request to the wireless communication devices 200A, 200B, and 200F as the transmission source of the radio wave detection result (step S303). The wireless communication devices 200A, 200B, and 200F which have received the reception request execute the reception process and transmit the reception result to the integrated control device 100 (step S304). Further, the reception result may be communicated using the multiple access scheme described above.

Further, in the example of FIG. 8, the reception process is executed on the basis of the reception request, but if the radio wave is detected, the wireless communication device 200 may cause the process to transition from the radio wave detection process to the reception process directly with no reception request.

(Transmission Process)

Figure 9:
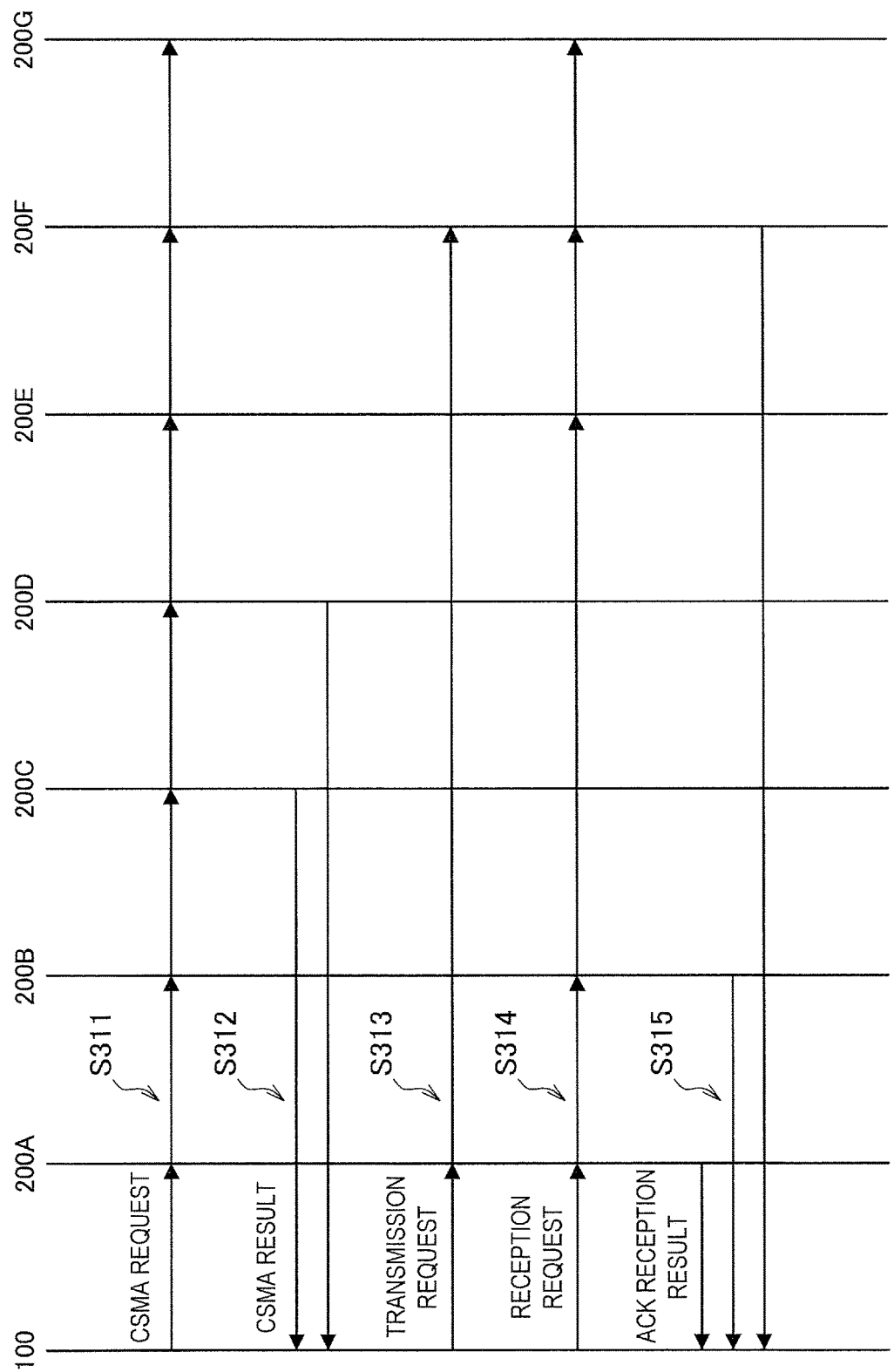
FIG. 9 is a sequence diagram conceptually illustrating an example of a transmission process of a wireless communication system according to the embodiment.

Next, the transmission process of the wireless communication system will be described with reference to FIG. 9. FIG. 9 is a sequence diagram conceptually illustrating an example of the transmission process of the wireless communication system according to one embodiment of the present disclosure.

In accordance with the arrival of the transmission timing, the integrated control device 100 transmits the CSMA request to the wireless communication devices 200A to 200G (step S311). The wireless communication devices 200A to 200G which have received the CSMA request execute the CSMA process, and the wireless communication devices 200C and 200D which have determined that the state of the transmission path is in a busy state transmits the CSMA result to the integrated control device 100 (step S312).

The integrated control device 100 which has received the CSMA result transmits the transmission request to the wireless communication devices 200A and 200F which are not the wireless communication devices 200C and 200D which are the transmission source of the CSMA result, and the direction related to the directivity is not adjacent to the wireless communication devices 200C and 200D (step S313). Accordingly, the signal is transmitted only from the wireless communication device 200 having a relatively low risk of communication collision.

Further, the integrated control device 100 transmits the reception request for the acknowledgement signal (here also referred to as ACK signal) to the wireless communication devices 200B, 200F, and 200G which are adjacent to the wireless communication devices 200A and 200F in terms of the direction related to directivity in addition to the wireless communication devices 200A and 200F which are the transmission destination of the transmission request (step S314). The wireless communication devices 200A, 200B, and 200E so 200G which have received the reception request execute the reception process, and the wireless communication devices 200A, 200B, and 200F which have received the ACK signal transmit an ACK reception result to the integrated control device 100 (step S315).

Further, in a case in which the information indicating the reception level is included in the ACK reception result, the integrated control device 100 associates the wireless communication device 200A in which the reception level of the ACK signal is higher than those of the wireless communication device 200B and 200F with a device which is the transmission destination of the signal according to the transmission request.

(Transmission Process Using Learning Result)

Figure 10:
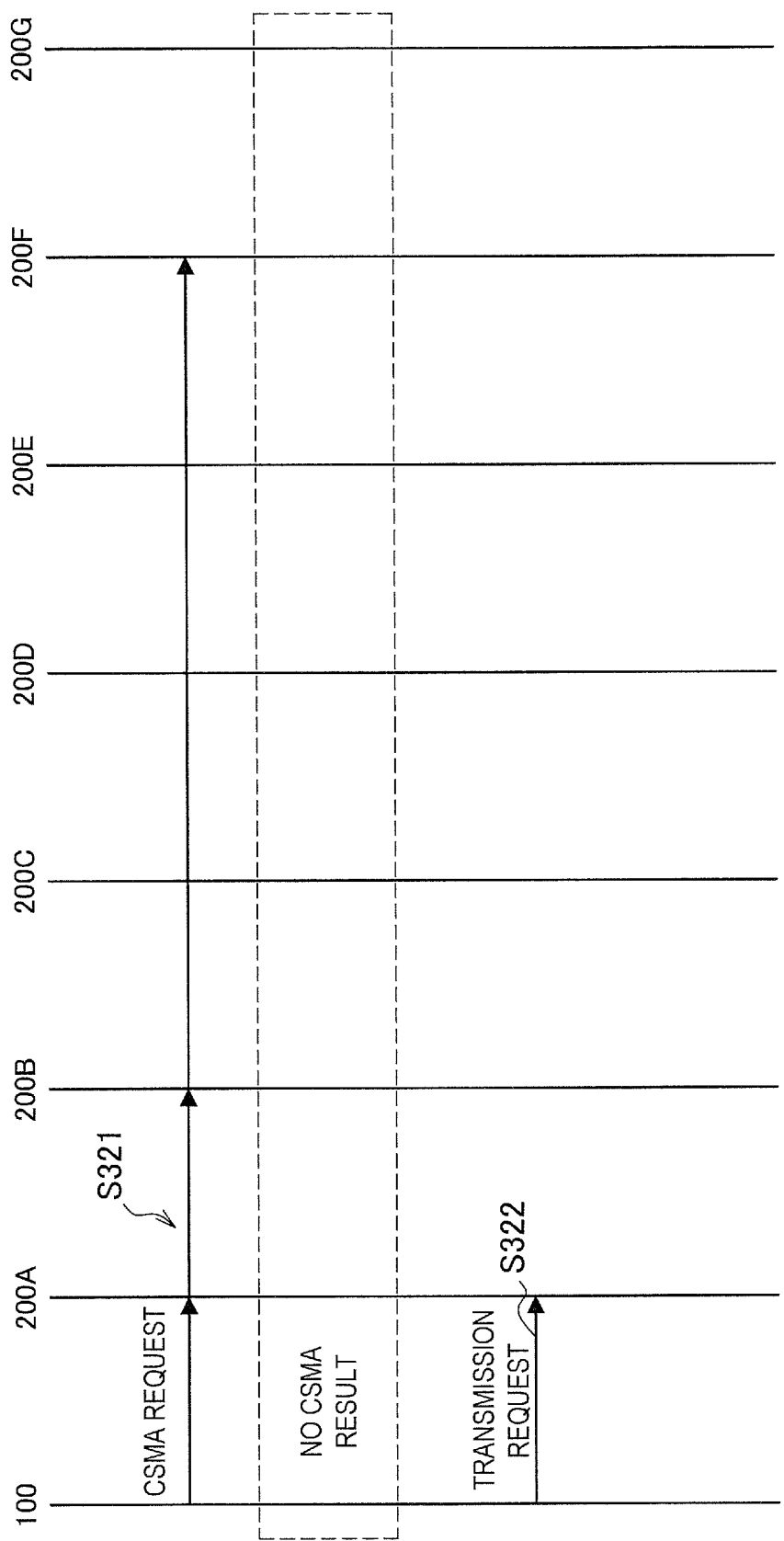
FIG. 10 is a sequence diagram conceptually illustrating an example of a transmission process using a learning result of a wireless communication system according to the embodiment.

Next, a transmission process using a learning result of the wireless communication system will be described with reference to FIG. 10. FIG. 10 is a sequence diagram conceptually illustrating an example of a transmission process using a learning result of the wireless communication system according to one embodiment of the present disclosure.

The integrated control device 100 specifies the wireless communication device 200A associated with the transmission destination of the signal, in a case in which the association for the transmission destination of the signal has already been stored. Further the integrated control device 100 specifies the wireless communication devices 200B and 200F which are not associated but have received the signal (the data signal or the acknowledgement signal) transmitted from the transmission destination of the signal in the past. Then, the integrated control device 100 transmits the CSMA request to the specified wireless communication devices 200A, 200B, and 200F in accordance with the arrival of the transmission timing (step S321).

The wireless communication devices 200A, 200B, and 200F which have received the CSMA request execute the CSMA process. The wireless communication devices 200A, 200B, and 200F which have determined that the state of the transmission path is in the idle slate do not transmit the CSMA result.

If a predetermined period elapses without receiving the CSMA result, the integrated control device 100 transmits the transmission request to the wireless communication device 200A (step S322). Accordingly, it is possible to reduce wireless communication resources used for signal transmission by reducing the number of wireless communication devices 200 that transmit a signal.

Further, in the example of FIG. 10, the CSMA request is also transmitted to the wireless communication devices 200B and 200F other than the wireless communication device 200A associated with the transmission destination of the signal, but the CSMA request may be transmitted only to the wireless communication device 200A.

Next, processes of the integrated control device 100 and the wireless communication device 200 will be described.

(Process of Integrated Control Device)

Figure 11:
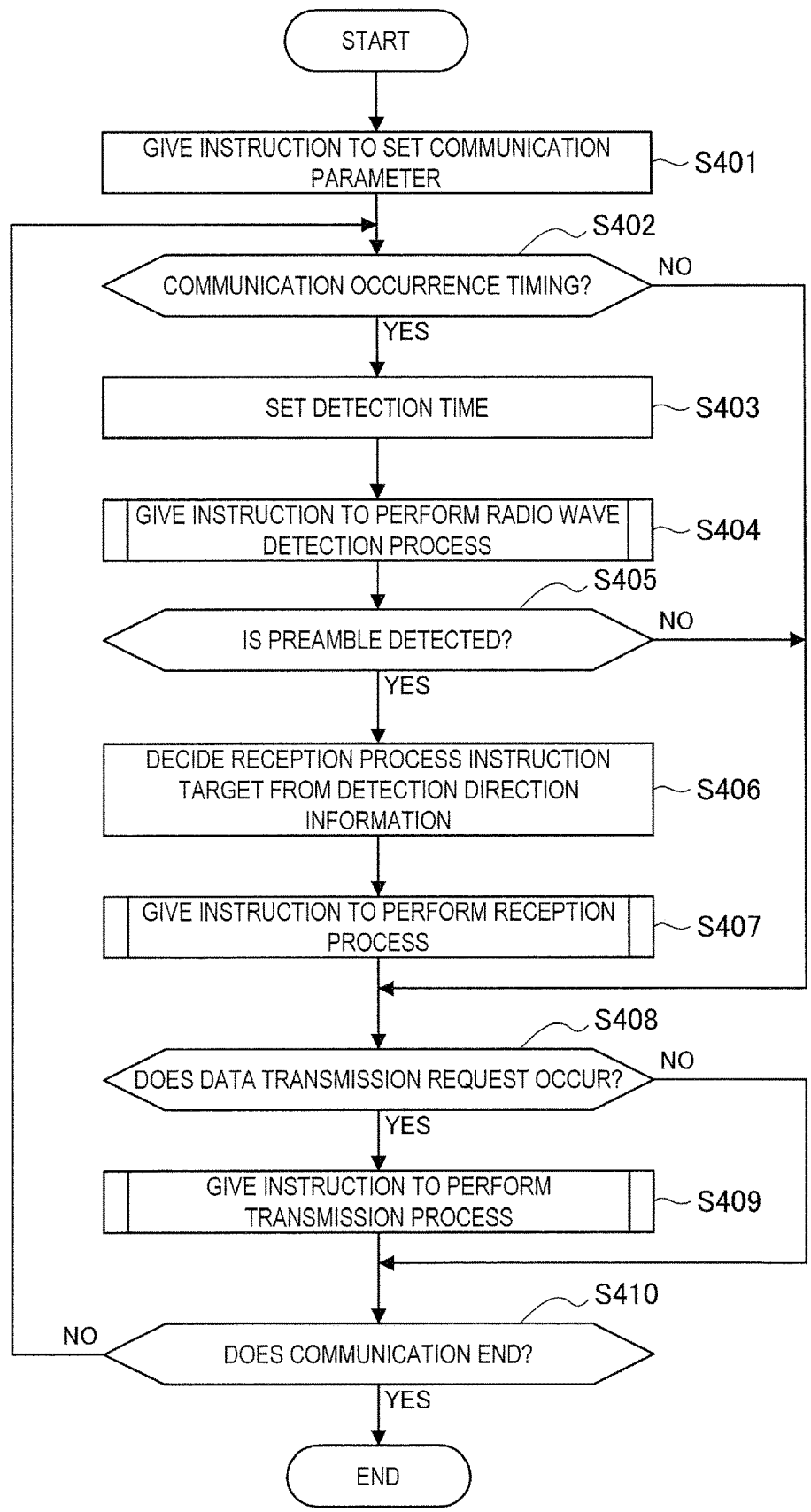
FIG. 11 is a flowchart conceptually illustrating an example of an overall process of an integrated control device according to the embodiment.

A process of the integrated control device 100 will be described. First, an overall process of the integrated control device 100 will be described with reference to FIG. 11. FIG. 11 is a flowchart conceptually illustrating an example of an overall process of the integrated control device 100 according to one embodiment of the present disclosure.

The integrated control device 100 instructs each wireless communication device 200 to set a communication parameter (step S401). Specifically, the control unit 103 causes the wired communication module 101 or the wireless communication module 102 to transmit various kinds of parameter information such as the detection parameter information, the reception parameter information, and the transmission parameter information to the wireless communication device 200.

Then, if it is determined that the communication occurrence timing arrives (YES in step S402), the integrated control device 100 decides a detection instruction target and sets a detection time (step S403). Specifically, if a timing of radio wave detection, signal reception, or signal transmission arrives, the control unit 103 decides at least one of a plurality of wireless communication devices 200 as the detection instruction target and sets a time to perform the detection process.

Then, the integrated control device 100 instructs the wireless communication device 200 to perform the radio wave detection process (step S404). Specifically, the control unit 103 causes the wired communication module 101 or the wireless communication module 102 to transmit the radio wave detection request to the wireless communication device 200. Further, the details will be described later.

Then, if it is determined that a predetermined preamble is detected by the wireless communication device 200 (YES in step S405), the integrated control device 100 decides a reception process instruction target from the detection direction information (step S406). Specifically the control unit 103 decides the reception process instruction target on the basis of the radio wave detection result received from the wireless communication device 200 performing the radio wave detection process.

Then, the integrated control device 100 instructs the wireless communication device 200 to perform the reception process (step S407). Specifically, the control unit 103 causes the wired communication module 101 or the wireless communication module 102 to transmit the reception request to the wireless communication device 200 decided as the reception process instruction target. Further, the details will be described later.

Further, if it is determined that the data transmission request occurs (YES in step S408), the integrated control device 100 instructs the wireless communication device 200 to transmit the transmission process (step S409). Specifically, the control unit 103 cause the wired communication module 101 or the wireless communication module 102 to transmit the transmission request to the wireless communication device 200 on the basis of the radio wave detection result received from the wireless communication device 200. Further, the details will be described later.

Then, the integrated control device 100 repeats the process of steps S402 to S409 until it is determined that the communication ends (YES in step S410). Further, if it is determined that the communication ends, a notification of information indicating the end of the communication or a communication function stop request may be given to the wireless communication device 200.

Figure 12:
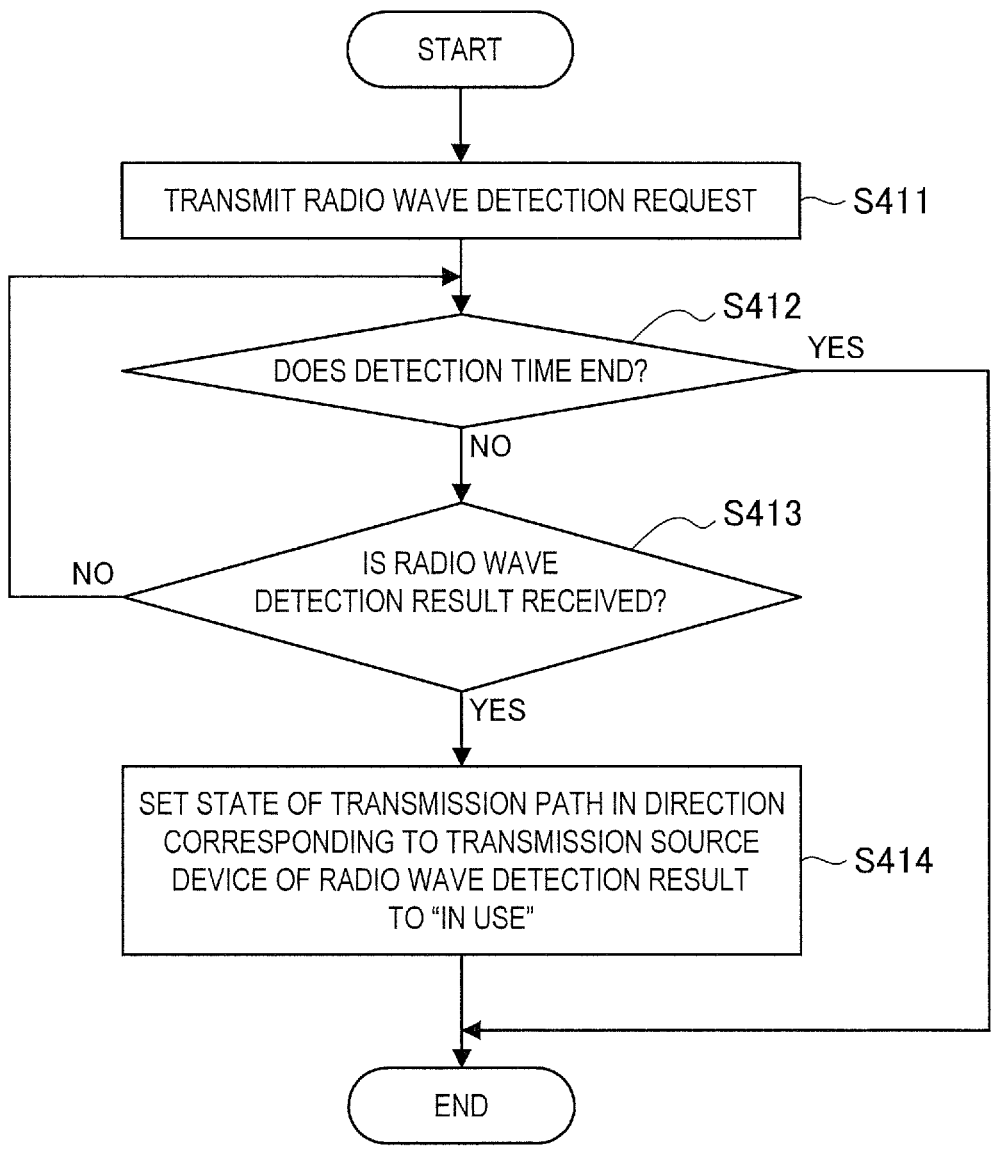
FIG. 12 is a flowchart conceptually illustrating an example of a radio wave detection instruction process of an integrated control device according to the embodiment.

Then, a radio wave detection instruction process of the integrated control device 100 will be described with reference to FIG. 12. FIG. 12 is a flowchart conceptually illustrating an example of a radio wave detection instruction process of the integrated control device 100 according to one embodiment of the present disclosure.

The integrated control device 100 transmits the radio wave detection request to the wireless communication device 200 (step S411). Specifically, in a case in which preamble detection (eventually, signal reception) is the purpose, the control unit 103 causes the wired communication module 101 or the wireless communication module 102 to transmit the radio wave detection request to all the wireless communication devices 200. Further, in a case in which signal detection (eventually, signal transmission) is the purpose, the control unit 103 causes the wired communication module 101 or the wireless communication module 102 to transmit the radio wave detection request to a specific wireless communication device 200.

Then, if it is determined that the radio wave detection result is received within a set detection time (YES in step S412) (YES in step S413), the integrated control device 100 sets the state of the transmission path in the direction corresponding to the transmission source device of the radio wave detection result to "in use" (step S414). Specifically, if the preamble detection result or the signal detection result is received from the wireless communication device 200, the control unit 103 sets the stare of the transmission path in the direction corresponding to the wireless communication device 200 to the busy state. Further, the state of the transmission path in the direction corresponding to the wireless communication device 200 which has not received a preamble detection result or a signal detection result may be set to the idle state.

Figure 13:
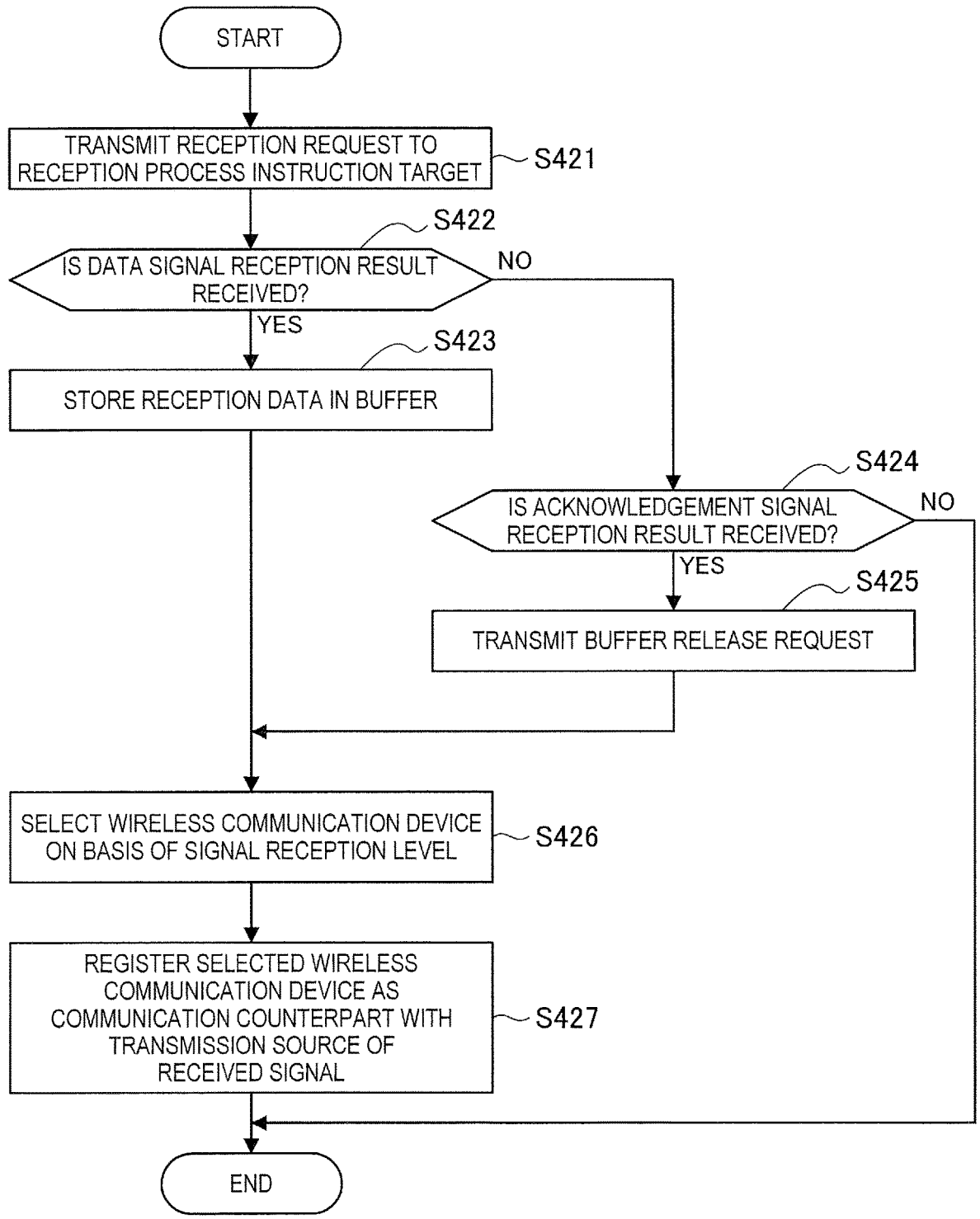
FIG. 13 is a flowchart conceptually illustrating an example of a reception instruction process of an integrated control device according to the embodiment.

Next, a reception instruction process of the integrated control device 100 will be described with reference to FIG. 13. FIG. 13 is a flowchart conceptually illustrating an example of a reception instruction process of the integrated control device 100 according to one embodiment of the present disclosure.

The integrated control device 100 transmits the reception request to the wireless communication device 200 serving as the reception process instruction target (step S421). Specifically, the control unit 103 causes the wired communication module 101 or the wireless communication module 102 to transmit the reception request for the data signal to the wireless communication device 200 which has detected the preamble in the radio wave detection process. Further, the control unit 103 causes the wired communication module 101 or the wireless communication module 102 to transmit the reception request for the acknowledgement signal to the wireless communication device 200 which is caused to receive the acknowledgement and the wireless communication device 200 which is adjacent to the corresponding wireless communication device 200 in terms of the direction related to the directivity.

Then, if it is determined that the data signal reception result is received from the wireless communication device 200 (YES in step S422), the integrated control device 100 stores reception data in the buffer (step S423). Specifically, if the data reception result is received, the control unit 103 stores the reception data in the buffer included in the integrated control device 100 if the data signal reception result including the reception data stored in the received signal is received from at least one wireless communication device 200.

On the other hand, if it is determined that the acknowledgement signal reception result is received from the wireless communication device 200 (YES in step S424), the integrated control device 100 transmits the buffer release request (step S425). Specifically, if the acknowledgement (ACK) signal reception result is received from at least one wireless communication device 200, the control unit 103 causes the wired communication module 101 or the wireless communication module 102 to transmit the buffer release request to the wireless communication device 200 which has not received the acknowledgement signal reception result. Further, the buffer release request may be transmitted to all the wireless communication devices 200.

Then, the integrated control device 100 selects the wireless communication device 200 on the basis of a signal reception level (step S426), and registers the selected wireless communication device 200 as a communication counterpart with the transmission source of the received signal (step S427). Specifically, the control unit 103 selects the wireless communication device 200 in which the reception level of the data signal or the acknowledgement signal received by the wireless communication device 200 is higher than the other wireless communication devices 200. Further, the control unit 103 causes the storage unit to store an association between the selected wireless communication device 200 and the transmission source device of the data signal or the acknowledgement signal. Further, the association may be distinguished in accordance with the type of signal such as the data signal or the acknowledgement signal.

Figure 14:
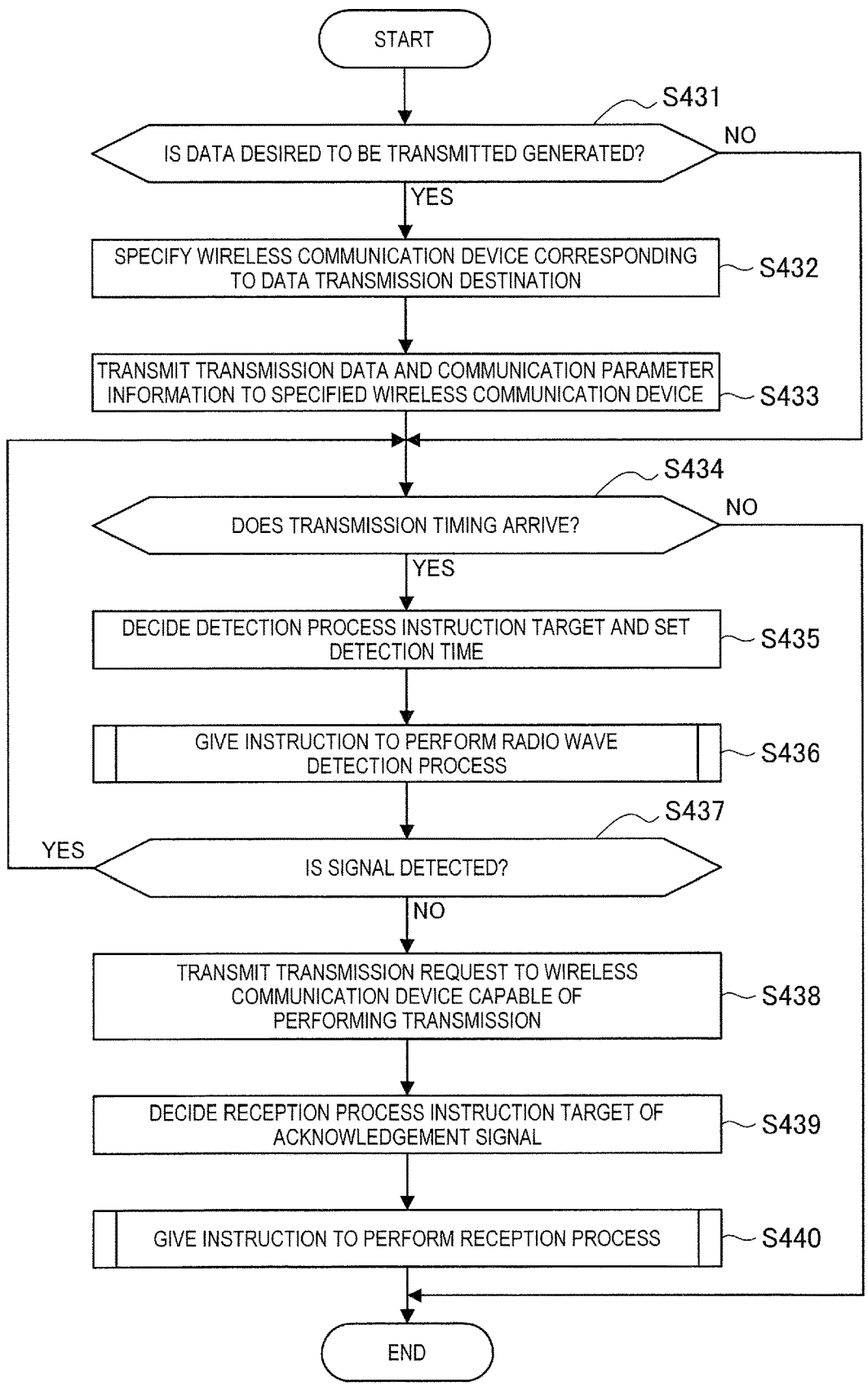
FIG. 14 is a flowchart conceptually illustrating an example of a transmission instruction process of an integrated control device according to the embodiment.

Next, the transmission instruction process of the integrated control device 100 will be described with reference to FIG. 14. FIG. 14 is a flowchart conceptually illustrating an example of a transmission instruction process of the integrated control device 100 according to one embodiment of the present disclosure.

If it is determined that data desired to be transmitted is generated (YES in step S431), the integrated control device 100 specifies the wireless communication device 200 corresponding to the data transmission destination (step S432). Specifically, if data desired to be transmitted is input from a user or an application via the input unit 104, the control unit 103 specifies the wireless communication device 200 associated with the transmission destination of the data on the basis of the stored association. Further, the data to be transmitted may be data input to the wireless communication device 200 via an input unit included in the wireless communication device 200.

Then, the integrated control device 100 transmits transmission data and communication parameter information to the specified wireless communication device 200 (step S433). Specifically, the control unit 103 causes the wired communication module 101 or the wireless communication module 102 to transmit the transmission data and the transmission parameter information desired to be transmitted to the specified wireless communication device 200. Further, the transmission data and the transmission parameter information may be transmitted to all the wireless communication devices 200. Further the transmission parameter information may be a parameter whose type is different from that of the parameter related to the transmission parameter information transmitted in step S401 described above or may be the same type of parameter having a different value.

Further, if it is determined that the transmission timing arrives (step S434), the integrated control device 100 decides a detection process instruction target and sets the detection time (step S435). Specifically, the control unit 103 determines the wireless communication device 200 which is caused to perform transmission as the detection process instruction target, and sets a standby time for signal detection according to a predetermined transmission path access control procedure.

Then, the integrated control device 100 instructs the decided wireless communication device 200 to perform the radio wave detection process (step S436). Specifically, the control unit 103 instructs the decided wireless communication device 200 to perform the radio wave detection process at the set detection time. Detailed description is omitted.

If it is determined that the signal is detected in all of the wireless communication devices 200 serving as the detection process instruction target (YES in step S437), the integrated control device 100 causes the process to return to step S434. Specifically, in a case in which the signal detection result is received from all of the wireless communication devices 200 which are instructed to perform the radio wave detection process for the purpose of signal detection, the control unit 103 causes the process to return to step S434, and causes the wireless communication device 200 to be on standby for transmission until the transmission timing arrives again as in a predetermined access control procedure.

Then, if it is determined that no signal is detected in any of the wireless communication device 200 serving as the detection process instruction target (NO in step S437), the integrated control device 100 transmits the transmission request to the wireless communication device 200 capable of performing transmission (step S439). Specifically, if the signal detection result is not received from at least one wireless communication device 200 during the standby time for signal detection according to a predetermined access control procedure, the control unit 103 transmits the wired communication module 101 or the wireless communication module 102 to transmit the transmission request to at least one wireless communication device 200.

Thereafter, the integrated control device 100 decides an acknowledgement reception process target (step S439) and gives an instruction to perform the reception process (step S440). Specifically, the control unit 103 decides the wireless communication device 200 to which the transmission request is transmitted in step S438 and the wireless communication device 200 which is adjacent to the corresponding wireless communication device 200 in terms of the direction related to the directivity or all the wireless communication devices 200 as the reception process instruction target of the acknowledgement signal. Then, the integrated control device 100 instructs the wireless communication device 200 determined as the reception process instruction target of the acknowledgement signal to perform the reception process. Detailed description is omitted.

(Process of Wireless Communication Device)

Figure 15:
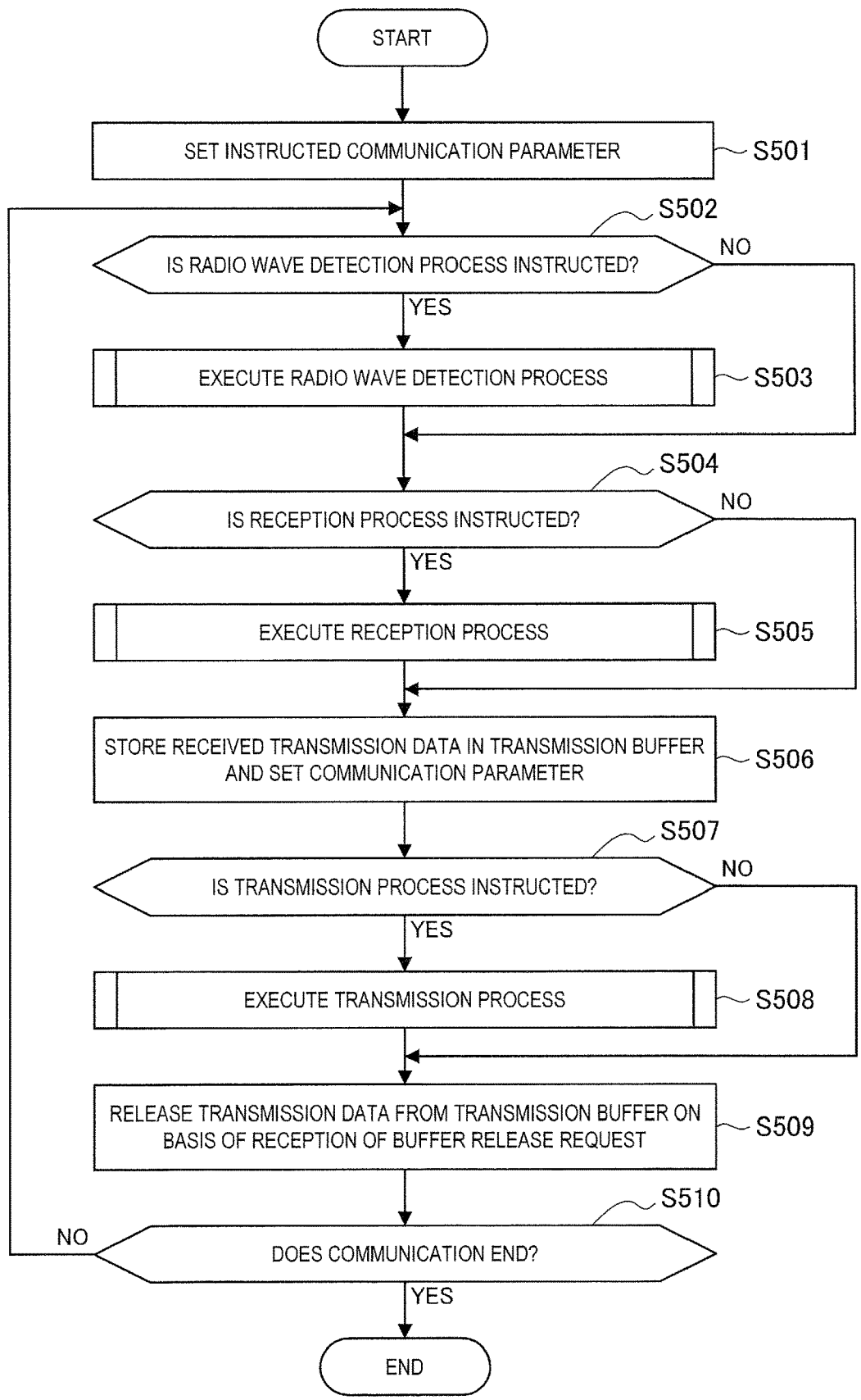
FIG. 15 is a flowchart conceptually illustrating an example of an overall process of a wireless communication device according to the embodiment.

Then, a process of the wireless communication device 200 will be described. First, an overall process of the wireless communication device 200 will be described with reference to FIG. 15. FIG. 15 is a flowchart conceptually illustrating an example of an overall process of the wireless communication device 200 according to one embodiment of the present disclosure.

The wireless communication device 200 sets the instructed communication parameter (step S501). Specifically, the control unit 204 causes the first wireless communication module 201 to set various kinds of parameter information such as the detection parameter information, the reception parameter information, and the transmission parameter information received from the integrated control device 100.

Then, if it is determined that the radio wave detection process is instructed (YES in step S502), the wireless communication device 200 executes the radio wave detection process (step S503). Specifically, if a preamble detection request or a signal detection request is received from the integrated control device 100, the control unit 204 causes the first wireless communication module 201 to execute the radio wave detection process intended for the preamble detection or the signal detection. Further, the details will be described later.

Further, if it is determined that the reception process is instructed (YES in step S504), the wireless communication device 200 executes the reception process (step S505). Specifically, if the reception request is received from the integrated control device 100, the control unit 204 causes the first wireless communication module 201 to execute the reception process. Further, the details will be described later.

Further, the wireless communication device 200 stores the received transmission data in the transmission buffer and sets the communication parameter (step S506). Specifically, if the transmission data and the communication parameter information are received from the integrated control device 100, the control unit 204 temporarily stores the received transmission data in the transmission buffer and sets the transmission parameter on the basis of the communication parameter information.

Further, if it is determined that the transmission process is instructed (YES in step S507), the wireless communication device 200 executes the transmission process (step S508). More specifically, if the transmission request is received from the integrated control device 100, the control unit 204 causes the first wireless communication module 201 to execute the transmission process. Further, the details will be described later.

Further, the wireless communication device 200 releases the transmission data from the transmission buffer on the basis of the reception of the buffer release request (step S509). Specifically, in a case in which the transmission is completed by reception of the acknowledgement in at least one wireless communication device 200, if the buffer release request transmitted from the integrated control device 100 to another wireless communication device 200 is received, the control unit 204 releases the transmission data stored in the transmission buffer.

Then, the wireless communication device 200 repeats the process of steps S502 to S509 until it is determined that the communication ends (YES in step S510). Specifically, the control unit 204 causes the process related to the communication to end when a predetermined time elapses after an instruction is given from the integrated control device 100. Further, the process end on the basis of the notification of the information indicating the end of the communication or the communication function stop request from the integrated control device 100.

Figure 16:
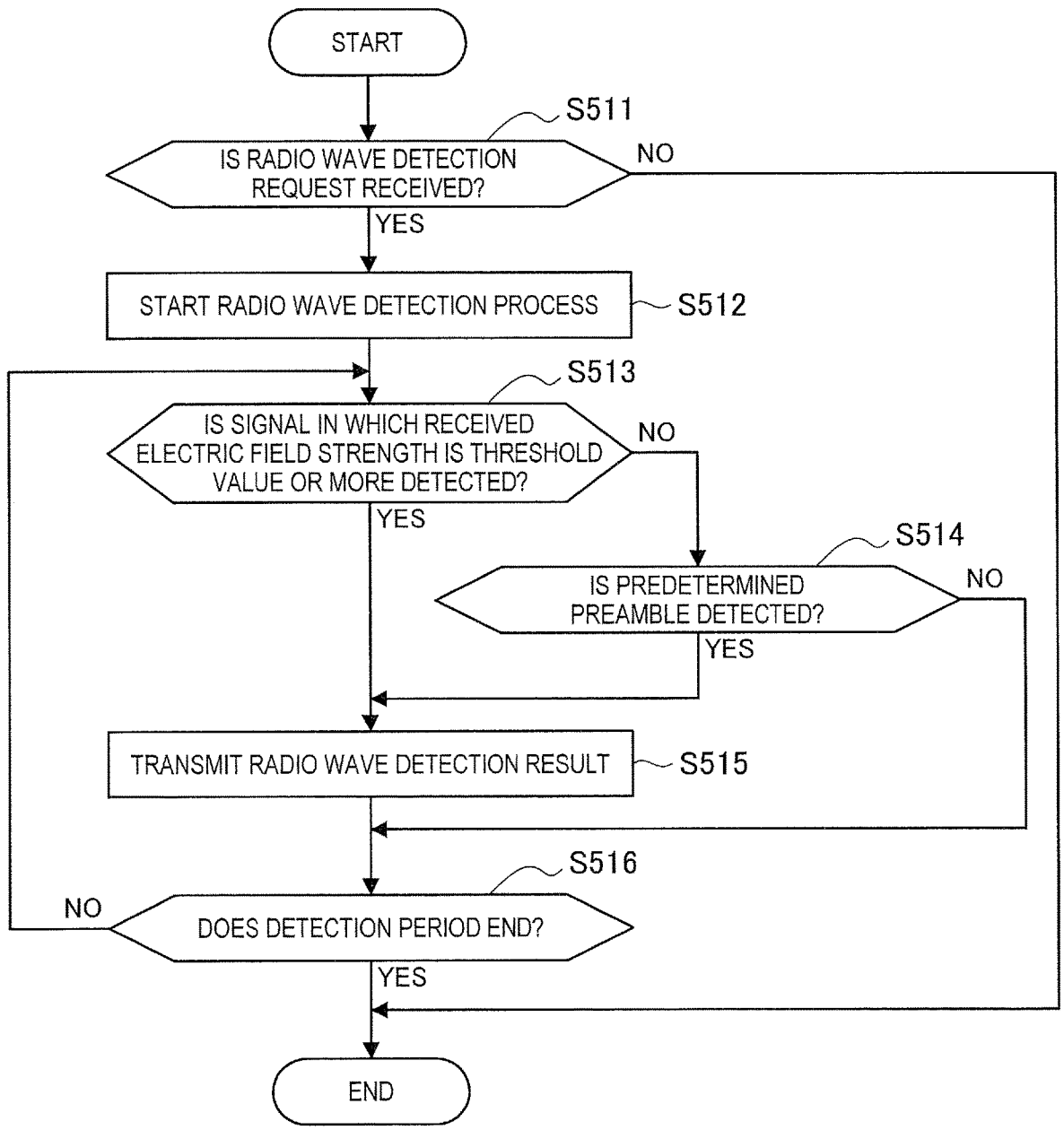
FIG. 16 is a flowchart conceptually illustrating an example of a radio wave detection process of a wireless communication device according to the embodiment.

Next, a radio wave detection process of the wireless communication device 200 will be described with reference to FIG. 16. FIG. 16 is a flowchart conceptually illustrating an example of a radio wave detection process of the wireless communication device 200 according to one embodiment of the present disclosure.

If it is determined that the radio wave detection request has been received (YES in step S511), the wireless communication device 200 starts the radio wave detection process (step S512). Specifically, if the preamble detection request or the signal detection request is received, the control unit 204 causes the first wireless communication module 201 to start a detection process for a preamble of a predetermined pattern or a detection process for a signal whose reception level is a threshold value or more. Further, the control unit 204 may cause the first wireless communication module 201 to start the virtual carrier sense process. Further, a result of the virtual carrier sense may be determined on the basis of whether or not a network allocation vector (NAV) is set.

Then, in a case in which it is determined that a signal (interference radio wave) having received electric field strength equal to or larger than a threshold value is detected (YES in step S513) or if a predetermined preamble is detected (YES in step S514), the wireless communication device 200 transmits the radio wave detection result to the integrated control device 100 (step S515). Specifically, if the signal having the reception level equal to or larger than a threshold value is detected, the control unit 204 causes the second wireless communication module 202 or the wired communication module 203 to transmit a signal detection result to the integrated control device 100. Further, if a preamble of a predetermined pattern is detected, the control unit 204 causes the second wireless communication module 202 or the wired communication module 203 to transmit a preamble detection result to the integrated control device 100.

Further, in a case in which the virtual carrier sense is executed in accordance with a predetermined access control procedure, a virtual carrier sense result may be transmitted to the integrated control device 100 when the NAV is set.

Then, the wireless communication device 200 continues the radio wave detection process until it is determined that the detection period ends (YES in step S516). Specifically, if a processing period of the preamble detection process, the signal detection process, or the virtual carrier sense process ends, the control unit 204 causes the process to end.

Figure 17:
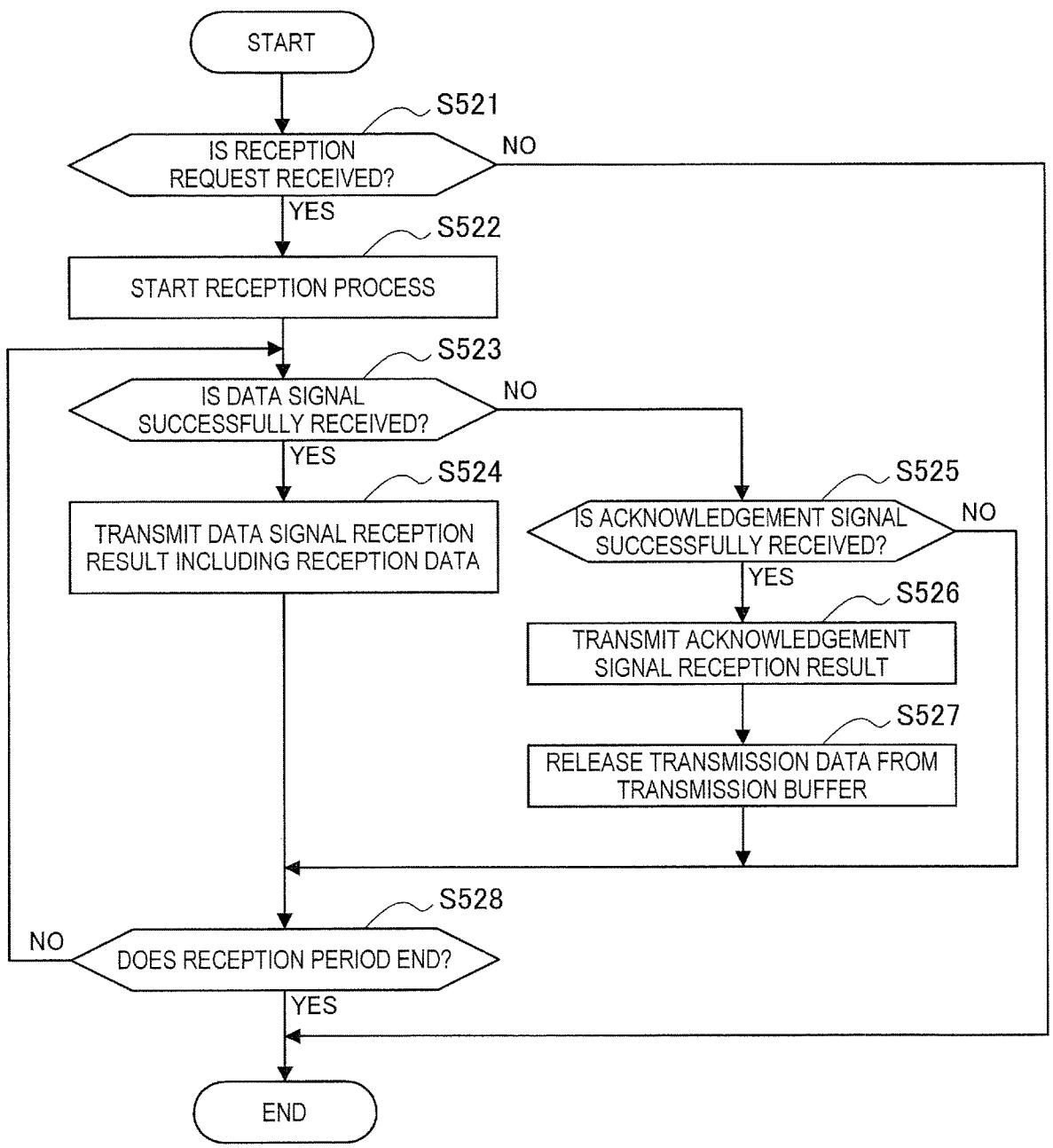
FIG. 17 is a flowchart conceptually illustrating an example of a reception process of a wireless communication device according to the embodiment.

Next, a reception process of the wireless communication device 200 will be described with reference to FIG. 17. FIG. 17 is a flowchart conceptually illustrating an example of a reception process of the wireless communication device 200 according to one embodiment of the present disclosure.

If it is determined that the reception request is received (YES in step S521), the wireless communication device 200 starts the reception process (step S522). Specifically, if the reception request is received, the control unit 204 causes the first wireless communication module 201 to start the reception process.

Then, the wireless communication device 200 determines whether or not the data signal is successfully received (step S523). Specifically if a header portion of a frame serving as the signal is received, the control unit 204 receives a data portion on the basis of information of a communication parameter (for example, a coding rate, a data length, or the like) related to the reception of the data portion stored in the header portion. Then, the control unit 204 determines whether or not there is a frame error on the basis of error correction information such as a cyclic redundancy check (CRC) stored in a tail of the frame. If there is no error in the frame, the control unit 204 determines a type of the received frame, and in a case in which it is determined that the type of frame is a data frame, the control unit 204 stores data stored in the data portion of the data frame in a reception buffer.

If it is determined that the data signal is successfully received (YES in step S523), the wireless communication device 200 transmits a data signal reception result including reception data to the integrated control device 100 (step S524). Specifically, the control unit 204 causes the second wireless communication module 202 or the wired communication module 203 to transmit the data stored in the reception buffer and information indicating the reception level of the data frame to the integrated control device 100 as the data signal reception result.

Further, if it is determined that the acknowledgement signal is received successfully (step S525), the wireless communication device 200 transmits an acknowledgement reception result to the integrated control device 100 (step S526). Specifically, if it is determined that the type of frame determined to have no error is an acknowledgement frame (ACK frame), the control unit 204 causes the second wireless communication module 202 or the wired communication module 203 to transmits information indicating that the acknowledgement frame is received, information indicating the reception level of the acknowledgement frame, and the like to the integrated control device 100 as the acknowledgement signal reception result.

Then, the wireless communication device 200 releases data specified from the acknowledgement signal from the transmission buffer (step S527). Specifically, after the acknowledgement signal reception result is transmitted, the control unit 204 causes the first wireless communication module 201 to release data related to the transmission signal corresponding to the received acknowledgement signal from the transmission buffer. Further, the control unit 204 may be on standby for reception of the buffer release request transmitted from the integrated control device 100 and release the transmission data from the transmission buffer.

Then, the wireless communication device 200 continues the reception process until it is determined that the reception period ends (step S528). Specifically, in a case in which the processing period of the reception process of the signal ends, the control unit 204 ends the process.

Further, if the reception of the data signal or the acknowledgement signal fails, a reception result indicating a reception failure may be transmitted to integrated control device 100.

Figure 18:
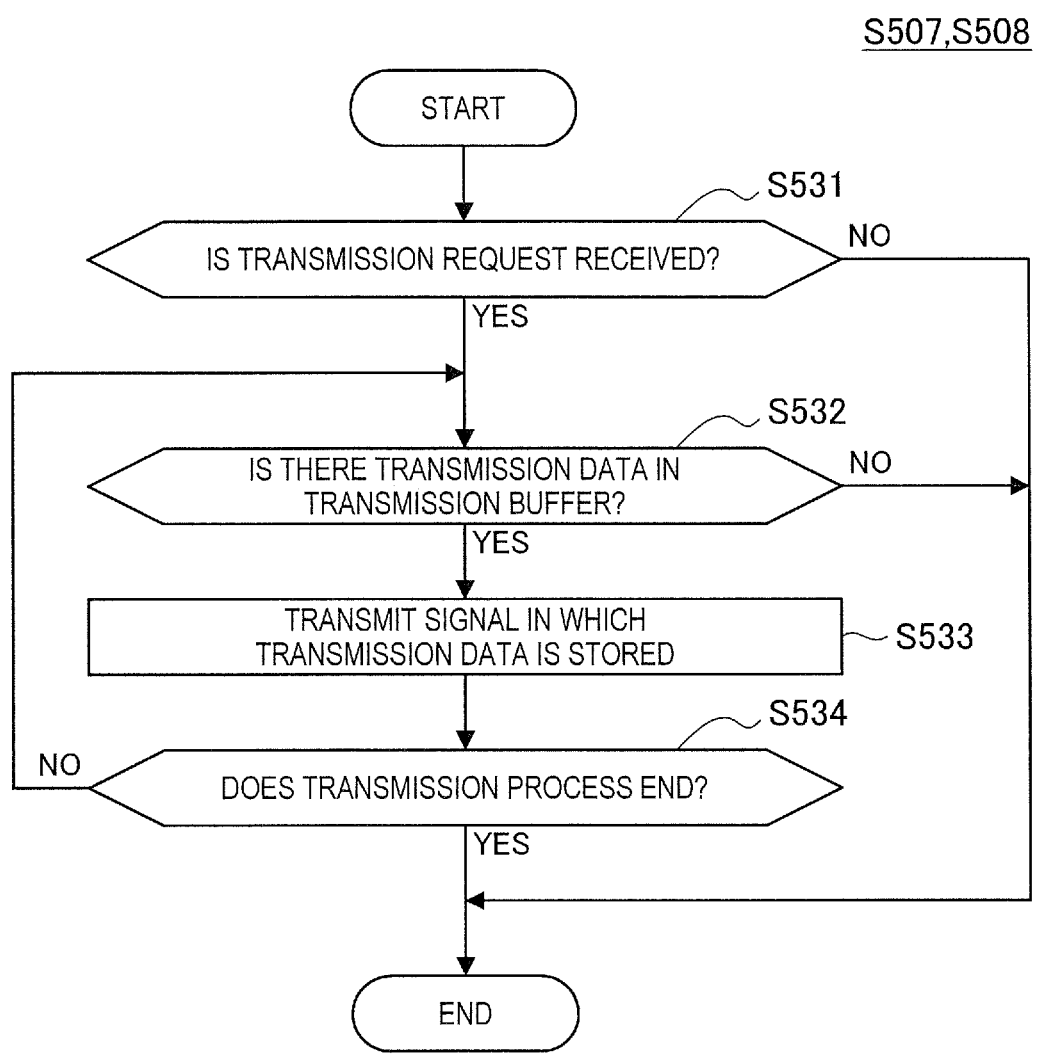
FIG. 18 is a flowchart conceptually illustrating an example of a transmission process of a wireless communication device according to the embodiment.

Next, a transmission process of the wireless communication device 200 will be described with reference to FIG. 18. FIG. 18 is a flowchart conceptually illustrating an example of a transmission process of the wireless communication device 200 according to one embodiment of the present disclosure.

If it is determined that the transmission request is received (YES in step S531), the wireless communication device 200 determines whether or not there is transmission data in the transmission buffer (step S532). Specifically, if the transmission request is received from the integrated control device 100, the control unit 204 determines whether or not the transmission data is stored in the transmission buffer.

If it is determined that there is transmission data in the transmission buffer (YES in step S532), the wireless communication device 200 transmits a signal in which the transmission data is stored (step S533). Specifically, the control unit 204 causes the first wireless communication module 201 to transmit the signal based on the transmission data to the transmission buffer.

Then, the wireless communication device 200 performs the process of steps S532 and S533 until it is determined that the transmission process ends (YES in step S534). Specifically, the control unit 204 continues the transmission process until it is determined that a transmission process period set as the transmission parameter ends. If the transmission process period ends, the control unit 204 causes the process to end.

2.4. Application Example

Figure 19:
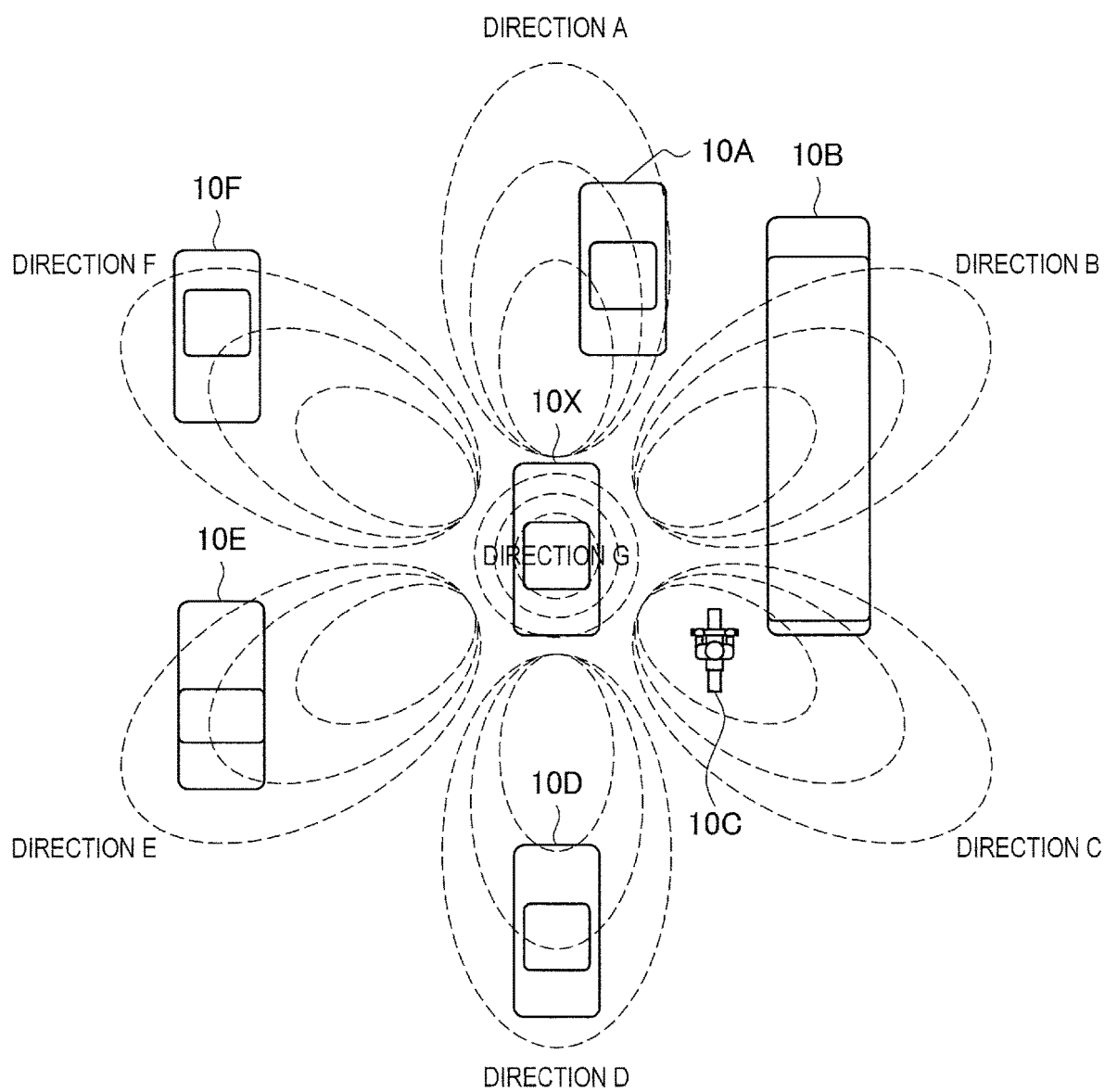
FIG. 19 is a diagram for describing an application example of a wireless communication system according to the embodiment.
Figure 20:
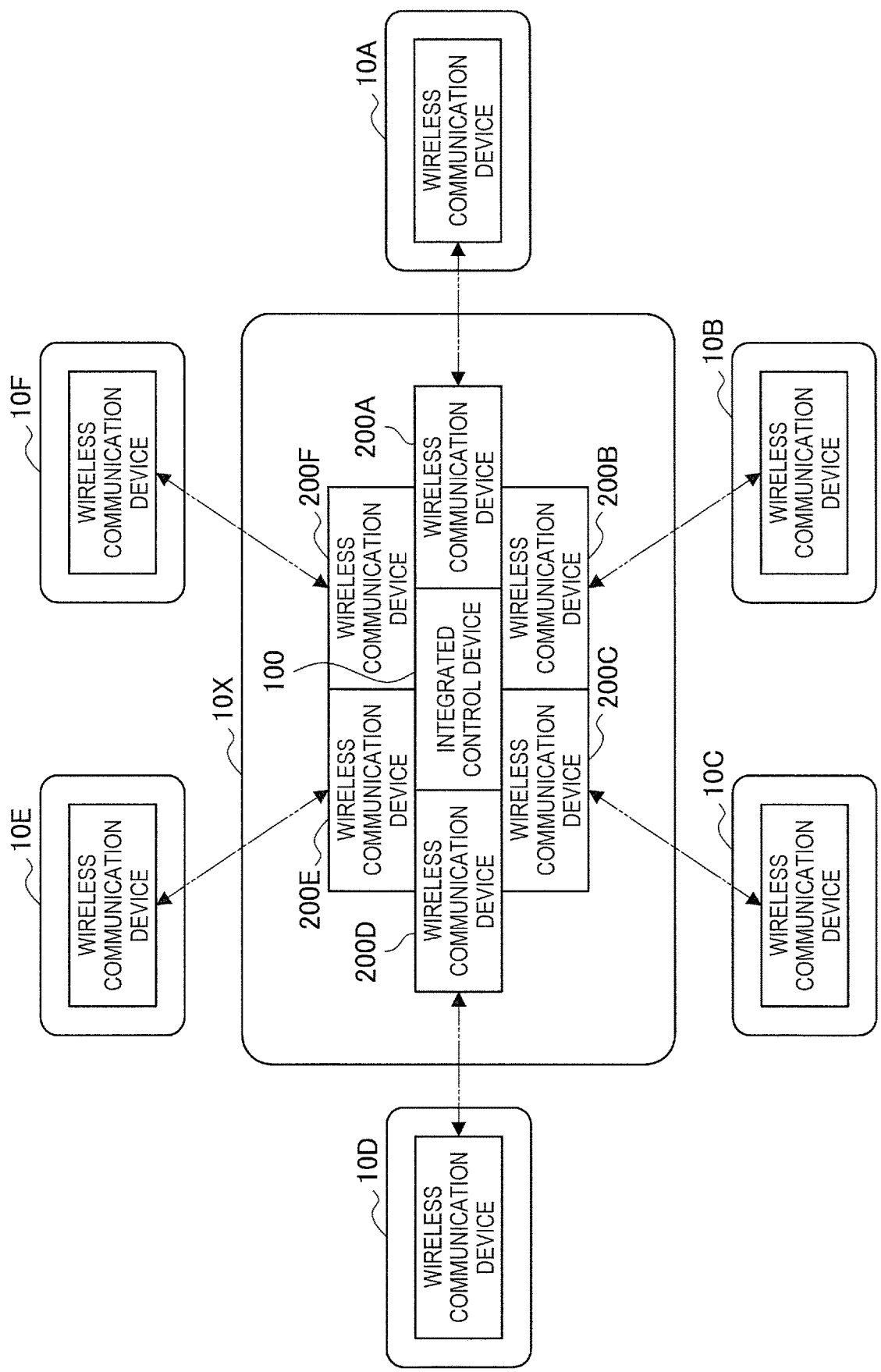
FIG. 20 is a diagram for describing an application example of a wireless communication system according to the embodiment.

The flow of the process of the wireless communication system according to one embodiment of the present disclosure has been described above. Next, an application example of the wireless communication system will be described. A case in which wireless communication having directivity is performed between mobile bodies will be described with reference to FIG. 19 and FIG. 20. FIGS. 19 and 20 are diagrams for describing an application example of the wireless communication system according to one embodiment of the present disclosure.

A case in which vehicles 10A to 10F are located around the vehicle 10X on which the integrated control device 100 and the wireless communication device 200 of the wireless communication system are installed as illustrated in FIG. 19 is assumed. The vehicles 10A to 10F are adjacent to the wireless communication devices 200A to 200F, respectively.

In this case, the wireless communication system decides the wireless communication devices 200A to 200F corresponding to the vehicles 10A to 10F on the basis of detection or reception of signals transmitted from the vehicles 10A to 10F. Then, as illustrated in FIG. 20, the wireless communication devices installed in the vehicles 10A to 10F communicates with the wireless communication devices 200A to 200F, respectively.

Here, since the wireless communication performed by the wireless communication device 200 has directivity, a plurality of pairs of wireless communication devices can simultaneously communicate with each other. In other words, the communication of the plurality of pairs is spatially multiplexed. For example, communication between the wireless communication device installed in the vehicle 10A and the wireless communication device 200A and communication between the wireless communication device installed in the vehicle 10C and the wireless communication device 200C can be performed at the same time. Similarly, communication between the wireless communication device installed in the vehicle 10B and the wireless communication device 200B and communication between the wireless communication device installed in the vehicle 10F and the wireless communication device 200F can be performed at the same time.

2.5. Conclusion of One Embodiment of the Present Disclosure

As described above, according to one embodiment of the present disclosure, the integrated control device 100 gives an instruction to perform radio wave detection to at least one of a plurality of wireless communication devices 200 performing wireless communication with directivity, and controls communication of the wireless communication device 200 on the basis of the first information specifying a direction in which the radio wave is detected by the wireless communication device 200. Further, the wireless communication device 200 executes a radio wave detection process in a range of a direction related to directivity on the basis of the instruction to perform the radio wave detection, provides the first information to the integrated control device 100 (communication control unit), and performs wireless communication with directivity on the basis of an instruction from the integrated control device 100.

In the related art, when wireless communication having directivity is performed, a communication direction decision process is performed in advance. For example, in a case in which the training procedure in beam forming is performed, a communication direction is decided by exchange of a training signal and feedback. However, the training procedure increases the overhead in communication. On the other hand, it is considered to fix the communication direction. In this case, the communication direction decision processing can be omitted. However, since communication is performed in the fixed direction irrespective of a position of a communication counterpart, wireless communication resources are likely to be wasted.

On the other hand, according to one embodiment of the present disclosure, by controlling the wireless communication having the directivity in the wireless communication device 200 specified on the basis of the direction in which the radio wave is detected, a possibility of success of the wireless communication can be increased without performing the communication direction decision process of the related art. Therefore, it is possible to suppress the wireless communication resources from being wasted due to a failure of wireless communication. Therefore, it is possible to achieve both suppression of the overhead in communication and the efficient use of wireless communication resources. Further, wireless communication having directivity has a higher transmission rate than wireless communication having no directivity. Therefore, according to one embodiment of the present disclosure, it is possible to improve the efficiency of wireless communication with a high transmission rate and provide more efficient wireless communication.

Further, the integrated control device 100 controls the reception mode of the wireless communication device 200 on the basis of the first information. Further, the wireless communication device 200 receives the signal on the basis of the instruction from the integrated control device 100, and provides the signal reception result to the integrated control device 100. Therefore, the reception with directivity can be performed more promptly than in the related art. Accordingly the occupation of wireless communication resources can be reduced.

Further, the integrated control device 100 gives an instruction to receive a signal to the wireless communication device 200 which is specified from the first information and has detected the radio wave. For this reason, it is possible to cause only the wireless communication device 200 having a relatively high possibility of success of signal reception to perform the reception process. Therefore, the power consumption of the wireless communication device 200 can be suppressed.

Further, on the basis of the power level of the received signal the integrated control device 100 associates the wireless communication device 200 which has received the received signal with the transmission source of the received signal. Here, as the reception level of the signal is higher, the success rate of communication is higher. In this regard, the wireless communication device 200 is recorded in accordance with the reception level of the signal, and thus it is possible to select an appropriate wireless communication device 200 in accordance with a communication counterpart, a communication quality, or the like.

Further, the integrated control device 100 gives an instruction to perform a process related to communication to the wireless communication device 200 specified on the basis of the association. Therefore, it is possible to increase the success rate of communication by causing an appropriate wireless communication device 200 to perform communication. Therefore, it is possible to suppress the wireless communication resources from being wasted due to a communication failure.

Further, the integrated control device 100 instructs the wireless communication device 200 specified on the basis of the wireless communication device 200 which has transmitted the signal to receive the response signal to the transmission signal. Therefore, since an appropriate wireless communication device 200 is caused to receive the acknowledgement signal as well, the reception success rate can be increased. Therefore, retransmission of the transmission signal is suppressed, and the wireless communication resources can be effectively used.

Further, the integrated control device 100 controls the transmission mode of the wireless communication device 200 on the basis of the first information. Further, the wireless communication device 200 transmits the signal on the basis of the transmission instruction from the integrated control device 100. Therefore, it is possible to perform transmission with, directivity more promptly than in the related art. Accordingly, the occupation of wireless communication resources can be reduced.

Further, the control of the transmission mode includes control of whether or not transmission is performed, and the integrated control device 100 gives an instruction to transmit the signal to the wireless communication device 200 other than the wireless communication device 200 which has detected the radio wave. Therefore, even while the radio waves are being output from peripheral devices, the signals can be transmitted without undergoing a communication collision. Therefore, the communication standby time can be reduced, and the communication efficiency can be improved.

Further, the wireless communication device 200 other than the wireless communication device 200 which has detected the radio wave includes the wireless communication device 200 which is not adjacent to the wireless communication device 200 which has detected the radio wave in terms of the direction related to directivity. Here, the wireless communication system may be installed in the mobile body, and the devices around the wireless communication system may also be installed in the mobile body. Therefore, a radio wave transmitted from a moved peripheral device may be an interference radio wave of the signal transmitted from the wireless communication device 200 in the vicinity of the wireless communication device 200 which has detected the radio wave. On the other hand, the communication conflict can be more reliably avoided by causing the wireless communication device 200 which is far away not to be adjacent to the wireless communication device 200 which has detected the radio wave to transmit the signal.

Further, the first information includes the identification information of the wireless communication device 200. Therefore, communication in a desired direction can be controlled by designating the wireless communication device 200. Therefore, the process of the integrated control device 100 can be simplified.

Further, the integrated control device 100 instructs or controls the wireless communication device 200 using wireless communication of a scheme different from a scheme of the wireless communication with the directivity. Therefore, communication with a device outside the wireless communication system and communication within the wireless communication system can be performed at the same time. Further, it is possible to prevent a possibility of collision occurring in communication inside and outside the wireless communication system. Therefore, it is possible to smoothly control the communication of the wireless communication device 200.

Further, the wireless communication device 200 causes the reception function to be activated only in a case in which there is a reception instruction from the integrated control device 100. Therefore, the power consumption in the wireless communication device 200 can be further suppressed.

Further, the integrated control device 100 is installed in a device outside the wireless communication device 200, and the wireless communication device 200 and the integrated control device 100 are connected via communication. Therefore, when the integrated control device 100 and the wireless communication device 200 are installed separately, it is possible to prevent a remaining battery amount or a processing load from affecting each other. Further, the integrated control device 100 may be installed in a specific wireless communication device 200 or may be installed in each of a plurality of wireless communication devices 200, or a plurality of integrated control devices 100 may operate in cooperation.

Further, in a case in which a plurality of wireless communication devices 200 is installed, the wireless communication system can perform transmission and reception at the same time. Further, in a case in which a plurality of wireless communication devices 200 is arranged so that the communication directions of the wireless communication devices 200 are adjacent to each other as illustrated in FIG. 2, the wireless communication system can perform communication similar to an antenna having no directivity.

2.6. Modified Examples

One embodiment of the present disclosure has been described above. Further, one embodiment of the present disclosure is not limited to the above example. First to third modified examples of one embodiment of the present disclosure will be described below.

First Modified Example

Figure 21:
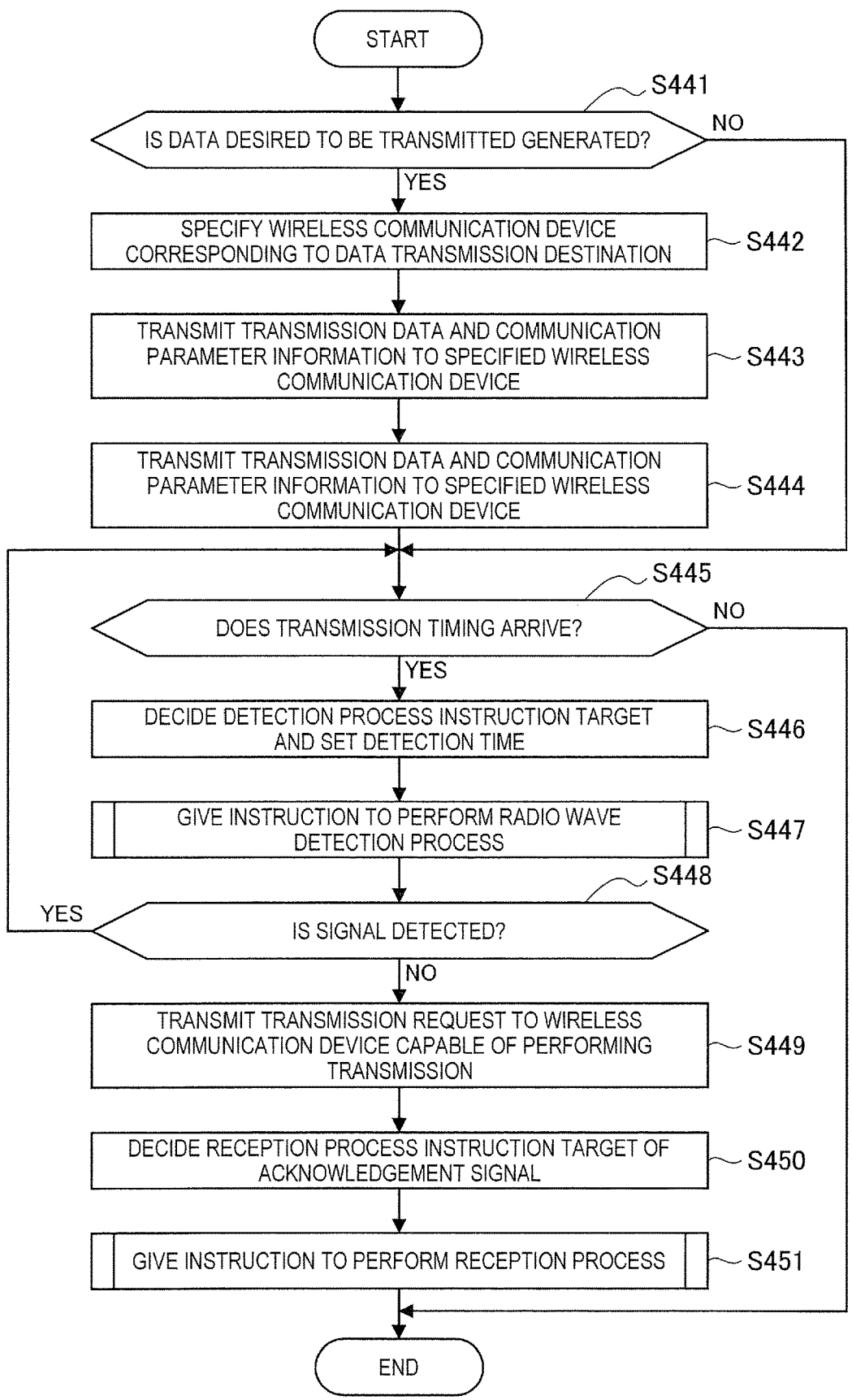
FIG. 21 is a flowchart conceptually illustrating an example of a transmission instruction process of an integrated control device according to a first modified example of the embodiment.

As a first modified example, the integrated control device 100 may control the transmission mode of the wireless communication device 200 on the basis of the detection level of the radio wave. Specifically, the control unit 103 controls the transmission parameter related to the signal transmission on the basis of the power level of the detected radio wave. As the controlled transmission parameter, there is transmission power. For example, the control unit 103 sets the transmission power used for the signal transmission to decrease as the detection level of the signal increases. This is because communication being already been performed is not disturbed. Further, in a case in which a signal is not detected, but the radio wave is detected, the transmission power may be set to be higher than usual. Further, the transmission parameter may be encoding information or a transmission data length. Further, a process of the present modified example will be described with reference to FIG. 21. FIG. 21 is a flowchart conceptually illustrating an example of a transmission instruction process of the integrated control device 100 according to the first modified example of the present disclosure. Further, description of a process which is substantially the same as the process described with reference to FIG. 14 is omitted.

If it is determined that data to be transmitted is generated (YES in step S441), the integrated control device 100 specifies the wireless communication device 200 corresponding to the data transmission destination (step S442).

Then, the integrated control device 100 decides the communication parameter in the specified wireless communication device 200 on the basis of the detection level of the radio wave (step S443), and transmits data and the decided communication parameter information to the specified wireless communication device 200 (step S444). Specifically, the control unit 103 decides the transmission power in accordance with the detection level of the radio wave. Further, the detection level may be the detection level of the radio wave detected by the wireless communication device 200 which transmits the signal, or may be the detection level of the radio wave detected by another wireless communication device 200 (for example, an adjacent wireless communication device 200). Then, the control unit 103 causes the wired communication module 101 or the wireless communication module 102 to transmit information indicating the decided transmission power to the wireless communication device 200.

Further, if it is determined that the transmission timing arrives (step S445), the integrated control device 100 decides the detection process instruction target and sets the detection time (step S446). Then, the integrated control device 100 gives an instruction to perform the radio wave detection process to the determined wireless communication device 200 (step S447). Then, if it is determined that no signal is detected in any of the wireless communication devices 200 serving as the detection process instruction target (YES in step S448), the integrated control device 100 transmits the transmission request to the wireless communication device 200 capable of performing transmission (step S449). Thereafter, the integrated control device 100 decides the wireless communication device 200 serving as the reception process instruction target of the acknowledgement signal (step S450), and gives an instruction to perform the acknowledgement reception process to the wireless communication device 200 (step S451).

As described above, according to the first modified example, the integrated control device 100 controls the transmission parameter related to the signal transmission on the basis of the power level of the detected radio wave. Therefore, it is possible to suppress communication being already been performed from being disturbed and increase a possibility of success of reception of a signal to be transmitted by the wireless communication device 200 by the interference radio wave. Therefore, it is possible to suppress the decrease in the communication efficiency not only for communication of the wireless communication system but also for communication of the device which performs communication near the wireless communication system.

Further, the transmission parameter includes the transmission power. Therefore, both it is possible to control a possibility of communication success and power consumption relatively easily in accordance with a communication situation around the wireless communication system.

Second Modified Example

As a second modified example, the integrated control device 100 may select the wireless communication device 200 which is caused to receive the signal on the basis of the detection level of the radio wave. Specifically, the control unit 103 gives an instruction to receive the signal to the wireless communication device 200 specified on the basis of the detection level related to the detected radio wave. For example, the control unit 103 causes the wired communication module 101 or the wireless communication module 102 to transmit the reception request only to the wireless communication device 200 in which the radio wave detection level indicated by the radio wave detection result received from the wireless communication device 200 is a threshold value or more.

As described above, according to the second modified example, it is possible not only to detect the radio wave but also to select the wireless communication device 200 in which the detection level of the radio wave is a predetermined level or more as a receiving device. Accordingly, it is possible to reduce the number of wireless communication devices 200 performing the reception process while maintaining a possibility of reception of a signal. Therefore, the power consumption of the wireless communication device 200 can be suppressed.

Third Modified Example

As a third modified example, the integrated control device 100 may control the communication of the wireless communication device 200 on the basis of a situation of the mobile body in which the wireless communication device 200 is installed. Specifically, the control unit 103 selects the wireless communication device 200 which is caused to perform communication on the basis of movement information of the mobile body. As the movement information of the mobile body, there is information related to a moving direction of a vehicle. For example, as illustrated in FIG. 19, in a case in which the vehicle 10X travels forward, that is, in the direction A, and the vehicle 10F travels in a backward direction of the vehicle 10X, that is, in the direction D, the control unit 103 gives a notification of the transmission request to the wireless communication device 200E which transmits the signal in the direction E in addition to the wireless communication device 200F which transmits the signal in the direction F. In this case, it is possible to cope with a change in the wireless communication device 200 suitable for communication by the movement of the vehicle.

Further, as the movement information of the vehicle, there is information related to a moving speed of a vehicle. For example, the control unit 103 increases the number of wireless communication devices 200 which are caused to transmit the signal as the moving speed of the vehicle 10X increases. In this case, it is possible to suppress a risk of communication failure caused by the movement of the vehicle.

As described above, according to the third modified example, the integrated control device 100 selects the wireless communication device 200 which is caused to perform communication on the basis of the movement information of the mobile body in which the wireless communication device 200 is installed. Therefore, it is possible to change the wireless communication device 200 in accordance with the change in the communication state caused by the movement of the mobile body. Therefore, it is possible to improve a possibility of successful communication to be performed by the wireless communication device 200.

Fourth Modified Example

As a fourth modified example, the integrated control device 100 may control the transmission parameter on the basis of the detection direction information. Specifically, the control unit 103 controls the transmission parameter of the wireless communication device 200 specified from the detection direction information. As the transmission parameters, there are the encoding information, the transmission data length, and the transmission, power. For example, the control unit 103 lowers (that, performs redundancy) the coding rate to be set in the wireless communication device 200 which has detected the signal, decreases a data length to be transmitted, or increases the transmission power to be set as compared with other wireless communication devices 200. Further, the transmission timing of the wireless communication device 200 which has detected the signal may be set to a timing different from those of the other wireless communication devices 200.

As described above, according to the fourth modified example, the control of the transmission mode of the wireless communication device 200 by the integrated control device 100 includes the control of the transmission parameters related to the transmission of the signal, and the transmission parameters include at least one of the encoding information, the transmission data length, or the transmission power. Therefore, it is possible to facilitate successful transmission of the wireless communication device 200.

Further, it is possible to prevent the communication performed in the vicinity of the wireless communication device 200 from being disturbed.

3. APPLICATION EXAMPLE

The technology according to the present disclosure can be applied to various products. For example, the technology according to the present disclosure is implemented as apparatuses mounted on any type of mobile bodies such as automobiles, electric vehicles, hybrid electric vehicles, motorcycles, bicycles, personal mobilities, airplanes, drones, ships, robots, construction machines, and agricultural machines (tractors).

Figure 22:
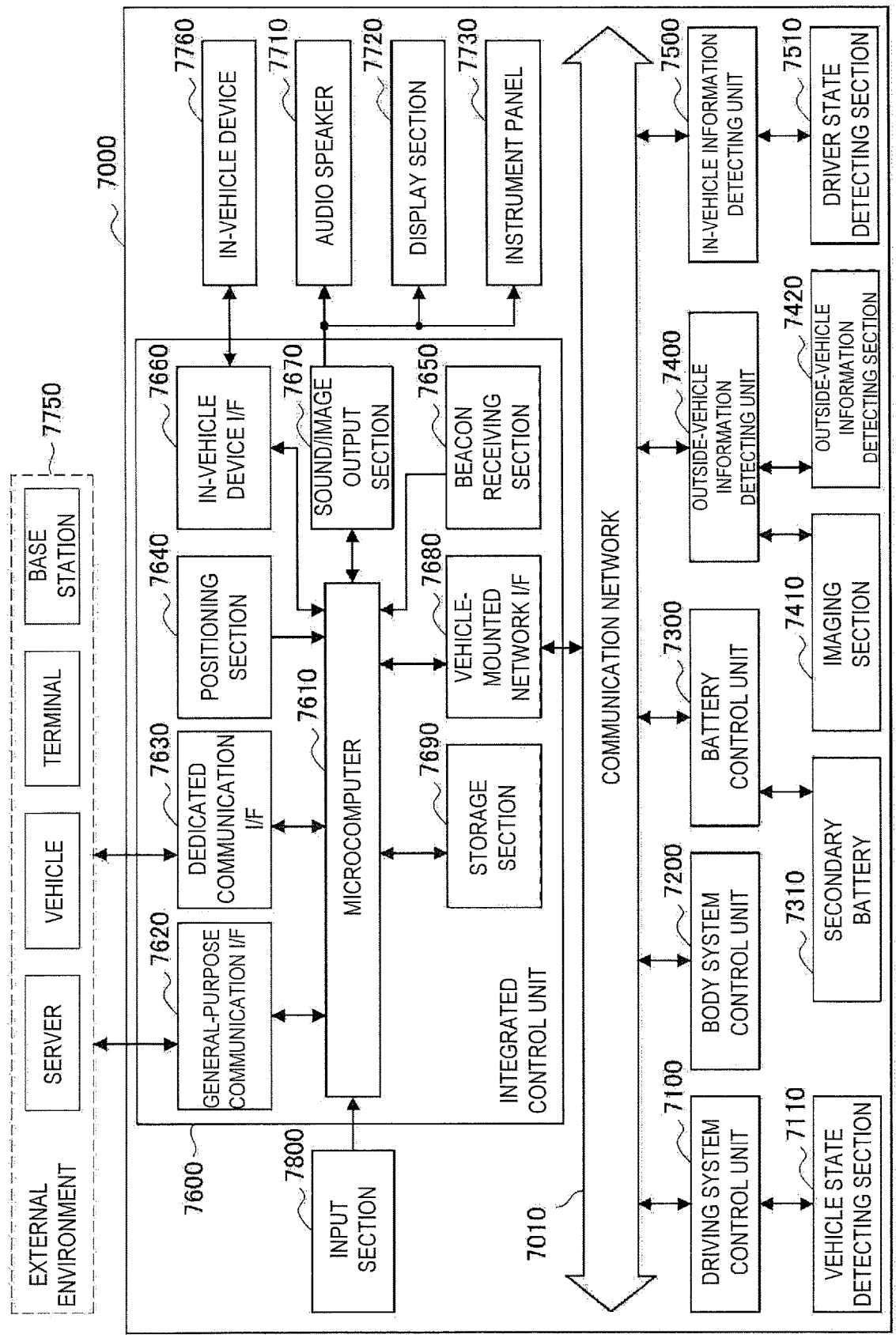
FIG. 22 is a block diagram depicting an example of schematic configuration of a vehicle control system.

FIG. 22 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 22, the vehicle control system 7000 includes a driving system control unit 7100, a body system control unit 7200, a battery control unit 7300, an outside-vehicle information detecting unit 7400, an in-vehicle notification detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wired communication or radio communication. A functional configuration of the integrated control unit 7600 illustrated in FIG. 22 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 23:
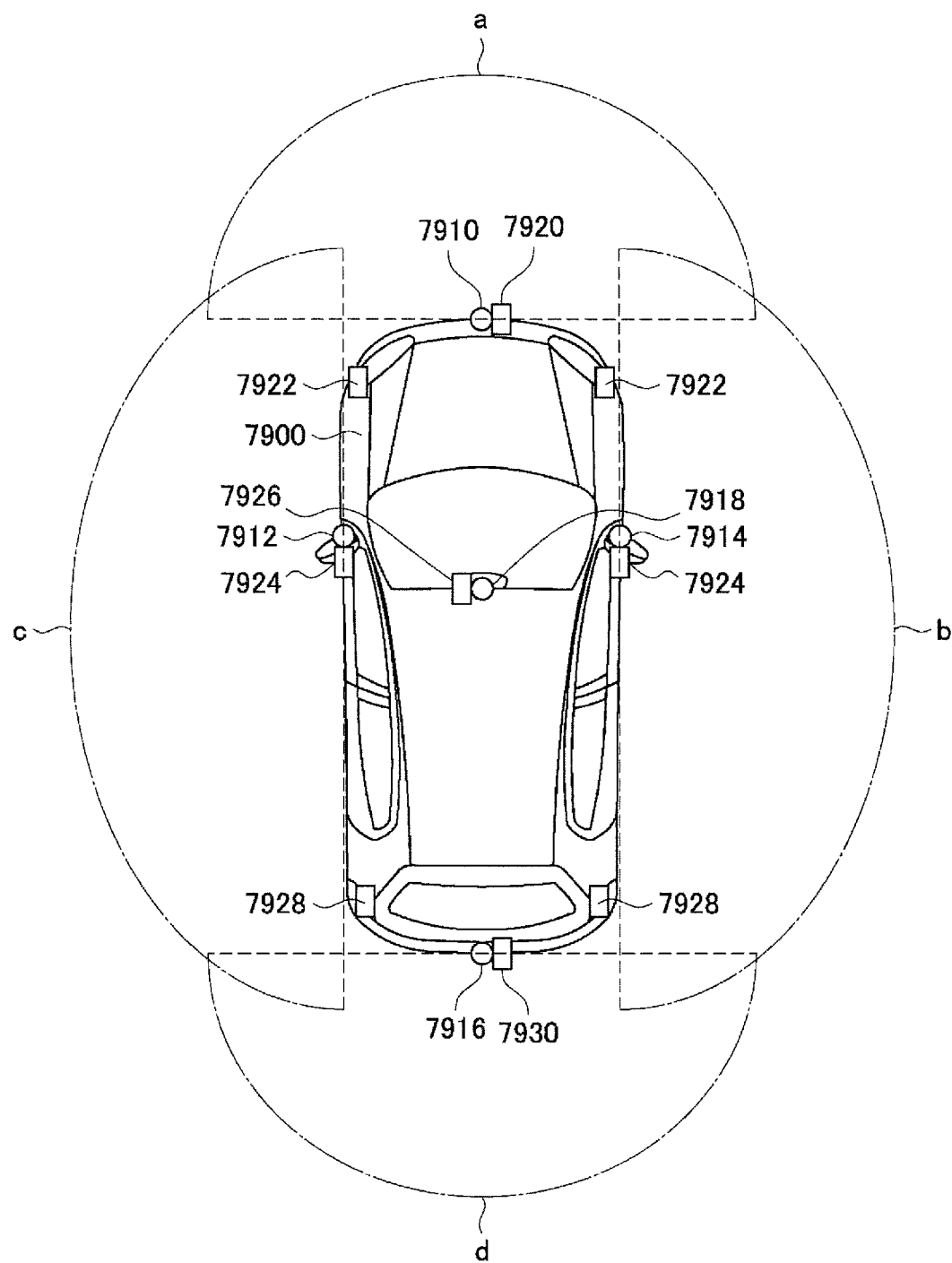
FIG. 23 is a diagram of assistance in explaining an example of installation positions of an outside-vehicle information detecting section and an imaging section.

FIG. 23 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 22, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identity a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 22, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 22 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly a sensor or a device connected to one of the control units may be connected to another control unit, and a plurality of control units may mutually transmit and receive detection information via the communication network 7010.

Note that a computer program for realizing each function of the integrated control device 100 and the wireless communication device 200 according to the present embodiment described using FIG. 6 can be implemented on any control unit, or the like. Further, it is also possible to provide a computer readable recording medium in which such a computer program is stored. The recording medium is, for example, a magnetic disk, an optical disk, a magnetooptical disk, a flash memory, or the like. Further, the above-described computer program may be delivered, for example, via a network without using a recording medium.

In the vehicle control system 7000 described above, the integrated control device 100 and the wireless communication device 200 according to the present embodiment described above with reference to FIG. 6 can be applied to the integrated control unit 7600 of the application example illustrated in FIG. 22. For example, the control unit 103, the wired communication module 101, and the wireless communication module 102 of the integrated control device 100 correspond to the microcomputer 7610 and the in-vehicle device I/F 7660 of the integrated control unit 7600. Further, the control unit 204, the first wireless communication module 201, the second wireless communication module 202, and the wired communication module 203 of the wireless communication device 200 correspond to the microcomputer 7610, the general-purpose communication I/F 7620, the in-vehicle device I/F 7660 of the integrated control unit 7600. Further, the wireless communication device 200 may be a device corresponding to the in-vehicle device 7760.

Further, at least some components of the integrated control device 100 and the wireless communication device 200 described above with reference to FIG. 6 are realized in a module for the integrated control unit 7600 illustrated in FIG. 22 (for example, an integrated circuit module constituted by one die). Alternatively, the integrated control device 100 and the wireless communication device 200 described above with reference to FIG. 6 may be realized by a plurality of control units of the vehicle control system 7000 illustrated in FIG. 22.

4. CONCLUSION

As described above, according to one embodiment of the present disclosure, by controlling the wireless communication having the directivity in the wireless communication device 200 specified on the basis of the direction in which the radio wave is detected, a possibility of success of the wireless communication can be increased without performing the communication direction decision process of the related art. Therefore, it is possible to suppress the wireless communication resources from being wasted due to a failure of wireless communication. Therefore, it is possible to achieve both suppression of the overhead in communication and the efficient use of wireless communication resources.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the integrated control device 100 is installed in the mobile body such as a vehicle, but the present technology is not limited to this example. For example, the integrated control device 100 is installed in a device outside the mobile body such as a server and connected with the wireless communication device 200 installed in the mobile body via communication.

Further, in the above embodiment, the example in which the wireless communication system is installed in the mobile body has been described, but an application destination of the wireless communication system is not limited to this. Specifically the wireless communication system may be installed in a fixed device which does not move. For example, the wireless communication system may be installed in a device installed on a roadside.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in the integrated control device 100 and the wireless communication device 200 to exhibit functions equivalent to those of the respective functional configurations of the integrated control device 100 and the wireless communication device 200. In addition, a storage medium that stores the computer program therein is also provided.

Additionally, the present technology may also be configured as below.

(1)
A wireless communication control device, including:
a detection control unit configured to give an instruction to perform radio wave detection to at least one of a plurality of wireless communication devices that perform wireless communication with directivity; and
a communication control unit configured to control communication of the wireless communication device on the basis of first information specifying a direction in which a radio wave is detected by the wireless communication device.

(2)
The wireless communication control device according to (1), in which the communication control unit controls a reception mode of the wireless communication device on the basis of the first information.

(3)
The wireless communication control device according to (2), in which the communication control unit gives an instruction to receive a signal to the wireless communication device which is specified from the first information and has detected a radio wave.

(4)
The wireless communication control device according to (2) or (3), in which the communication control unit associates the wireless communication device which has received a received signal with a transmission source of the received signal on the basis of a power level of the received signal.

(5)
The wireless communication control device according to (4), in which the communication control unit gives an instruction to perform a process related to communication to the wireless communication device specified on the basis of the association.

(6)
The wireless communication control device according to any one of (2) to (5), in which the communication control unit gives an inspection to receive a signal to the wireless communication device specified on the basis of a power level of a detected radio wave.

(7)
The wireless communication control device according to any one of (2) to (6), in which the communication control unit gives an instruction to receive a response signal to a transmission signal to the wireless communication device specified on the basis of the wireless communication device which has transmitted a signal.

(8)
The wireless communication control device according to any one of (1) to (7), in which the communication control unit controls a transmission mode of the wireless communication device on the basis of the first information.

(9)
The wireless communication control device according to (8),
in which the control of the transmission mode includes control of whether or not transmission is performed, and
the communication control unit gives an instruction to transmit a signal to the wireless communication device other than the wireless communication device which has detected a radio wave.

(10)
The wireless communication control device according to (9), in which the wireless communication device other than the wireless communication device which has detected the radio wave includes the wireless communication device which is not adjacent to the wireless communication device which has detected the radio wave in terms of a direction related to directivity.

(11)

The wireless communication control device according to any one of (8) to (10), in which the control of the transmission mode includes control of a transmission parameter related to transmission of a signal, and the transmission parameter includes at least one of encoding information, a transmission data length, or transmission power.

(12)

The wireless communication control device according to any one of (8) to (11), in which the communication control unit controls a transmission parameter related to transmission of a signal on the basis of a power level of a detected radio wave.

(12)

The wireless communication control device according to (11), in which the transmission parameter includes transmission power.

(13)

The wireless communication control device according to any one of (1) to (12), in which the first information includes identification information of the wireless communication device.

(14)

The wireless communication control device according to any one of (1) to (13), in which the communication control unit instructs or controls the wireless communication device using communication of a scheme different from a scheme of the wireless communication with directivity.

(15)

A wireless communication device, including:

a detection processing unit configured to execute a radio wave detection process in a range of a direction related to directivity on the basis of an instruction to perform radio wave detection;

a providing unit configured to provide first information specifying a direction in which a radio wave is detected to a communication control unit; and a communication unit configured to perform wireless communication with directivity on the basis of an instruction from the communication control unit.

(16)

The wireless communication device according to (15), in which the communication unit receives a signal on the basis of the instruction, and the providing unit provides a reception result for the signal to the communication control unit.

(17)

The wireless communication device according to (15) or (16), in which the communication unit causes a reception function to be activated only in a case in which there is a reception instruction from the communication control unit.

(18)

The wireless communication device according to any one of (15) to (17), in which the communication unit transmits a signal on the basis of a transmission instruction from the communication control unit.

(19)

The wireless communication device according to any one of (15) to (18), in which the communication control unit is installed in a device outside the wireless communication device, and the wireless communication device and the communication control unit are connected via communication.

(20)

A wireless communication system, including;

a detection control unit configured to give an instruction to perform radio wave detection to at least one of a plurality of communication units that perform wireless communication with directivity;

a detection processing unit configured to execute a radio wave detection process in a range of a direction related to directivity on the basis of the instruction to perform the radio wave detection;

a providing unit configured to provide first information specifying a direction in which a radio wave is detected to a communication control unit;

the communication control unit configured to control communication of a communication unit on the basis of first information specifying a direction in which the radio wave is detected by the communication unit; and the communication unit configured to perform wireless communication with directivity on the basis of an instruction from the communication control unit.

REFERENCE SIGNS LIST 100 integrated control device
101 wired communication module
102 wireless communication module
103 control unit
104 input unit
105 output unit
200 wireless communication device
201 first wireless communication module
202 second wireless communication module
203 wired communication module

The invention claimed is:

1. A wireless communication control device, comprising circuitry configured to:
    transmit an instruction to perform radio wave detection to a plurality of wireless communication devices that perform wireless communication with directivity, thereby causing each of the plurality of wireless communication devices to perform radio wave detection;
    receive a radio wave detection result from at least one wireless communication device of the plurality of wireless communication devices that detected a radio wave, the radio wave detection result comprises first information specifying a direction in which the radio wave is detected by the at least one wireless communication device; and
    transmit, based on the first information, an instruction to control a reception mode of the at least one wireless communication device of the plurality of wireless communication devices that detected the radio wave,
    wherein the instruction to control the reception mode causes the plurality of wireless communication devices that detected the radio wave to execute a reception process for receiving the radio wave, and
    wherein the instruction to control the reception mode is not transmitted to any of the plurality of wireless communication devices that did not detect the radio wave.

2. The wireless communication control device according to claim 1, wherein the circuitry is further configured to give an instruction to receive a signal to the at least one wireless communication device which is specified from the first information and has detected a radio wave.

3. The wireless communication control device according to claim 1, wherein the circuitry is further configured to associate the at least one wireless communication device which has received a received signal with a transmission source of the received signal on a basis of a power level of the received signal.

4. The wireless communication control device according to claim 3, wherein the circuitry is further configured to give an instruction to perform a process related to communication to the wireless communication device specified on a basis of the association.

5. The wireless communication control device according to claim 1, wherein the circuitry is further configured to give an instruction to receive a signal to the wireless communication device specified on a basis of a power level of a detected radio wave.

6. The wireless communication control device according to claim 1, wherein the circuitry is further configured to give an instruction to receive a response signal to a transmission signal to the wireless communication device specified on a basis of the wireless communication device which has transmitted a signal.

7. The wireless communication control device according to claim 1, wherein the circuitry is further configured to control a transmission mode of the at least one wireless communication device on a basis of the first information.

8. The wireless communication control device according to claim 7, wherein the control of the transmission mode includes control of whether or not transmission is performed, and
the circuitry is further configured to give an instruction to transmit a signal to a particular wireless communication device other than the at least one wireless communication device which has detected the radio wave.

9. The wireless communication control device according to claim 8, wherein the particular wireless communication device other than the at least one wireless communication device which has detected the radio wave includes a wireless communication device which is not adjacent to the wireless communication device which has detected the radio wave in terms of a direction related to directivity.

10. The wireless communication control device according to claim 7, wherein the control of the transmission mode includes control of a transmission parameter related to transmission of a signal, and
the transmission parameter includes at least one of encoding information, a transmission data length, or transmission power.

11. The wireless communication control device according to claim 7, wherein the circuitry is further configured to control a transmission parameter related to transmission of a signal on a basis of a power level of a detected radio wave.

12. The wireless communication control device according to claim 1, wherein the first information includes identification information of the at least one wireless communication device.

13. The wireless communication control device according to claim 1, wherein the circuitry is further configured to instruct or control the particular wireless communication device using communication of a scheme different from a scheme of the wireless communication with directivity.

14. A wireless communication device, comprising circuitry configured to:

execute a radio wave detection process in a range of a direction related to directivity on a basis of an instruction to perform radio wave detection transmitted by a communication control unit;
in a case that a radio wave is detected in response to the instruction, transmit first information specifying a direction in which the radio wave is detected to the communication control unit;
in a case that the radio wave is not detected in response to the instruction, the first information is not transmitted; and
perform wireless communication with directivity on a basis of a second instruction from the communication control unit and the first information, wherein the second instruction causes the wireless communication device to execute a reception process for receiving the radio wave in the case that the radio wave is detected.

15. The wireless communication device according to claim 14,
wherein the communication unit receives a signal on a basis of the instruction, and
the circuitry is further configured to provide a reception result for the signal to the communication control unit.

16. The wireless communication device according to claim 14, wherein the communication unit causes a reception function to be activated only in a case in which there is a reception instruction from the wireless communication device.

17. The wireless communication device according to claim 14, wherein the circuitry is further configured to transmit a signal on a basis of a transmission instruction from the communication control unit.

18. The wireless communication device according to claim 14,
wherein the communication control unit is installed in a device outside the wireless communication device, and
the wireless communication device and the communication control unit are connected via communication.

19. A wireless communication system, comprising circuitry configured to:
transmit an instruction to perform radio wave detection to a plurality of communication units that perform wireless communication with directivity;
execute a radio wave detection process related to directivity on a basis of the instruction to perform the radio wave detection in each of the plurality of communication units;
provide first information specifying a direction in which a radio wave is detected from at least one of the plurality of communication units that detected the radio wave to a communication control unit; and
transmit a second instruction to control the at least one of the plurality of communication units that detected the radio wave on a basis of the first information specifying the direction in which the radio wave is detected by the communication unit,
wherein the second instruction causes the plurality of communication units that detected the radio wave to execute a reception process for receiving the radio wave, and
wherein the second instruction is not transmitted to any of the plurality of communication units that did not detect the radio wave.

* * * * *